(12) United States Patent
Wu et al.

(10) Patent No.: US 12,244,522 B2
(45) Date of Patent: Mar. 4, 2025

(54) METHOD AND DEVICE IN A NODE USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/368,573

(22) Filed: Sep. 15, 2023

(65) Prior Publication Data

US 2024/0007238 A1    Jan. 4, 2024

Related U.S. Application Data

(63) Continuation of application No. 17/186,012, filed on Feb. 26, 2021, now Pat. No. 11,818,059, which is a
(Continued)

(30) Foreign Application Priority Data

Jan. 7, 2020   (CN) .......................... 202010012208.0

(51) Int. Cl.
*H04L 5/00* (2006.01)
*H04B 7/06* (2006.01)
*H04L 1/00* (2006.01)

(52) U.S. Cl.
CPC ........... *H04L 5/001* (2013.01); *H04B 7/0604* (2013.01); *H04L 1/0003* (2013.01);
(Continued)

(58) Field of Classification Search
CPC ................ H04B 7/0604; H04B 7/0404; H04B 7/0408; H04B 7/0695; H04B 7/0413;
(Continued)

(56) References Cited

U.S. PATENT DOCUMENTS 11,818,059 B2 * 11/2023 Wu ........................ H04L 5/0091
2019/0364556 A1 * 11/2019 Davydov ................ H04B 7/088
(Continued)

FOREIGN PATENT DOCUMENTS

| CN | 109462462 A | 3/2019 |
|---|---|---|
| CN | 109831232 A | 5/2019 |

(Continued)

OTHER PUBLICATIONS

ISR received in application No. PCT/CN2020/139899 dated Oct. 26, 2021.
(Continued)

*Primary Examiner* — Benjamin H Elliott, IV

(57) ABSTRACT

The present disclosure provides a method and device in a node for wireless communication. A first node receives a first signaling; transmits a first signal, a first reference signal and a first demodulation reference signal in the first time-frequency resource block set; and transmits a second signal, a second reference signal and a second demodulation reference signal in the second time-frequency resource block set. A third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port.

20 Claims, 12 Drawing Sheets

Related U.S. Application Data continuation of application No. PCT/CN2020/139899, filed on Dec. 28, 2020.

(52) U.S. Cl.
CPC .......... *H04L 1/0009* (2013.01); *H04L 5/0046* (2013.01); *H04L 5/0048* (2013.01)

(58) Field of Classification Search
CPC ..... H04B 7/0617; H04L 5/001; H04L 1/0003; H04L 1/0009; H04L 5/0046; H04L 5/0048; H04L 5/0026; H04L 5/0064; H04L 5/0023; H04L 5/0051; H04L 1/0023; H04L 5/0091
See application file for complete search history.

(56) References Cited

U.S. PATENT DOCUMENTS

| | | | |
|---|---|---|---|
| 2020/0052930 A1* | 2/2020 | Kim | H04L 27/2613 |
| 2020/0053738 A1* | 2/2020 | Harada | H04B 7/0626 |
| 2020/0059951 A1* | 2/2020 | Frenne | H04W 72/1268 |
| 2020/0076557 A1* | 3/2020 | Sun | H04W 24/10 |
| 2020/0177416 A1* | 6/2020 | Jiang | H04L 5/0051 |
| 2020/0221435 A1* | 7/2020 | Kim | H04L 5/0048 |
| 2020/0367244 A1* | 11/2020 | Yang | H04W 72/02 |
| 2021/0044402 A1* | 2/2021 | Gao | H04L 5/0048 |
| 2021/0211244 A1* | 7/2021 | Wu | H04L 5/001 |
| 2022/0006718 A1* | 1/2022 | Heath | H04L 41/0896 |
| 2022/0132595 A1* | 4/2022 | Ko | H04W 74/0866 |
| 2022/0239433 A1* | 7/2022 | Kim | H04L 5/0094 |
| 2022/0360408 A1* | 11/2022 | Jung | H04B 7/0628 |
| 2024/0007238 A1* | 1/2024 | Wu | H04L 5/0091 |

FOREIGN PATENT DOCUMENTS

| | | |
|---|---|---|
| WO | 2018201860 A1 | 11/2018 |
| WO | 2019103550 A1 | 5/2019 |
| WO | 2019153195 A1 | 8/2019 |

OTHER PUBLICATIONS

CN202010012208.0 Notification to Grant Patent Right for Invention dated Jul. 6, 2022.
CN202010012208.0 First Office Action dated Feb. 8, 2022.
CN202010012208.0 First Search Report dated Jan. 28, 2022.
Samsung "DiscussiononbeamindicationforULtransmission" 3GPPTSGRANWG1Meeting#91 R1-1720304, Nov. 17, 2017.
First Office Action received in application No. EP20829517.0 dated Aug. 5, 2023.
First Office Action received in application No. IN202217042364 dated Jan. 25, 2023.

* cited by examiner

P1 = P2

METHOD AND DEVICE IN A NODE USED FOR WIRELESS COMMUNICATION

CROSS REFERENCE TO RELATED APPLICATIONS

This application is a continuation of the U.S. patent application Ser. No. 17/186,012, filed on Feb. 26, 2021, which is a continuation of International Application No. PCT/CN2020/139899, filed Dec. 28, 2020, and claims the priority benefit of Chinese Patent Application No. 202010012208.0, filed on Jan. 7, 2020, the full disclosure of which is incorporated herein by reference BACKGROUND

TECHNICAL FIELD

The present disclosure relates to transmission methods and devices in wireless communication systems, and in particular to a method and device of radio signal transmission in a wireless communication system that support cellular networks.

RELATED ART

Reference Signal remains an essential means of ensuring communication quality in a wireless communication system. In a high-frequency band, the phase noise will cause a non-negligible impact on the performance of channel estimation. In NR R15, a Phase-Tracking Reference Signal (PTRS) is used by a receiver for phase-tracking, employing phase compensation in channel estimation to improve the precision of channel estimation. In an Uplink transmission, a Downlink Control Information (DCI) signaling indicates a PTRS-DeModulation Reference Signal (DMRS) association.

NR Rel-16 standard can support downlink transmissions of multiple Transmit-Receive Points(TRPs) or antenna panels, and has supported that one piece of DCI schedules downlink transmissions of multiple TRPs or antenna panels and multiple pieces of DCI respectively schedule downlink transmissions of multiple TRPs or antenna panels as well. In future NR standard evolution, one research focus is how to support Uplink transmissions of multiple TRPs or antenna panels.

SUMMARY

For transmissions of multiple TRPs, antenna panels or beams, how to design PTRSs becomes a key issue to be considered.

In view of the above problem, the present disclosure provides a solution. In description of the above problem, an Uplink is illustrated as an example. The present disclosure is also applicable to transmission scenarios of Downlink and Sidelink to achieve technical effects similar in Sidelink. Besides, a unified solution for different scenarios(including but not limited to Uplink, Downlink and Sidelink) can also help reduce hardware complexity and cost. It should be noted that the embodiments in a User Equipment (UE) in the present disclosure and characteristics of the embodiments may be applied to a base station if no conflict is incurred, and vice versa. The embodiments of the present disclosure and the characteristics of the embodiments may be mutually combined if no conflict is incurred.

In one embodiment, interpretations of terminology in the present disclosure can be found in specification protocols of 3GPP TS36 series.

In one embodiment, interpretations of terminology in the present disclosure can be found in specification protocol of 3GPP TS38 series.

In one embodiment, interpretations of terminology in the present disclosure can be found in specification protocols of 3GPP TS37 series.

In one embodiment, interpretations of terminology in the present disclosure can be found in specification protocols of Institute of Electrical and Electronics Engineers(IEEE).

The present disclosure provides a method in a first node for wireless communications, comprising:

receiving a first signaling, the first signaling being used for determining a first time-frequency resource block set and a second time-frequency resource block set;

transmitting a first signal, a first reference signal and a first demodulation reference signal in the first time-frequency resource block set; and transmitting a second signal, a second reference signal and a second demodulation reference signal in the second time-frequency resource block set;

herein, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

In one embodiment, a problem to be solved in the present disclosure is: for transmissions of multiple TRPs, antenna panels or beams, how to design PTRSs becomes a key issue that needed to be solved.

In one embodiment, the above method is essential in that a first signal and a second signal are respectively two data transmissions, a first reference signal and a second reference signal are respectively PTRSs of the two data transmissions, a first demodulation reference signal and a second demodulation signal are respectively DMRSs of the two data transmissions, the PTRSs of the two data transmissions correspond to a same port number, and a first signaling determines DMRS port numbers respectively associated with PTRS port numbers of the two data transmissions. The above method is advantageous in that the two data transmissions can be performed for different TRPs, antenna panels or beams, so that a most appropriate DMRS port number can be associated to a PTRS port number of each data transmission.

According to one aspect of the present disclosure, the above method is characterized in that the third antenna port and the first antenna port are QCL, the fourth antenna port and the second antenna port are QCL; frequency-domain resources occupied by the third antenna port belong to frequency-domain resources occupied by the first antenna port, and frequency-domain resources occupied by the fourth antenna port belong to frequency-domain resources occupied by the second antenna port.

According to one aspect of the present disclosure, the above method is characterized in comprising:

receiving a first information block;

herein, the first information block is used for indicating a bandwidth threshold set, the bandwidth threshold set is used for determining T bandwidth set(s), and the T bandwidth set(s) corresponds(respectively correspond) to T frequency-domain density(densities), T being a positive integer; a scheduling bandwidth of the first signal is used for determining a first frequency-domain density, the first frequency-domain density is one of the T frequency-domain density(densities), a scheduling bandwidth of the second signal is used for determining a second frequency-domain density, the second frequency-domain density is one of the T frequency-domain density(densities), the first frequency-domain density is used for determining frequency-domain resources occupied by the first reference signal, and the second frequency-domain density is used for determining frequency-domain resources occupied by the second reference signal.

According to one aspect of the present disclosure, the above method is characterized in comprising:

receiving a second information block;

herein, the second information block is used for indicating an MCS threshold set, the MCS threshold set is used for determining S MCS index set(s), and the S MCS index set(s) corresponds(respectively correspond) to S time-domain density(densities), S being a positive integer; an MCS index of the first signal is used for determining a first time-domain density, the first time-domain density is one of the S time-domain density(densities), an MCS index of the second signal is used for determining a second time-domain density, the second time-domain density is one of the S time-domain density(densities), the first time-domain density is used for determining time-domain resources occupied by the first reference signal, and the second time-domain density is used for determining time-domain resources occupied by the second reference signal.

According to one aspect of the present disclosure, the above method is characterized in that the first signaling is used for indicating a first index and a second index, the first index is used for determining a QCL parameter that transmits the first signal, and the second index is used for determining a QCL parameter that transmits the second signal.

According to one aspect of the present disclosure, the above method is characterized in that P1 antenna port number(s) is(are) port number(s) of P1 antenna port(s) that transmits(transmit) the first reference signal, the third antenna port is one of the P1 antenna port(s), and the target antenna port number is one of the P1 antenna port number(s); P2 antenna port number(s) is(are) port number(s) of P2 antenna port(s) that transmits(transmit) the second reference signal, the fourth antenna port is one of the P2 antenna port(s), and the target antenna port number is one of the P2 antenna port number(s); P1 is a positive integer, and P2 is a positive integer.

According to one aspect of the present disclosure, the above method is characterized in that the P1 is equal to 1, the P2 is equal to 1, the P1 antenna port number is the target antenna port number, the third antenna port is the P1 antenna port, the P2 antenna port number is the target antenna port number, and the fourth antenna port is the P2 antenna port; or, the first signaling is used for determining the P1 and the P2.

The present disclosure provides a method in a second node for wireless communications, comprising:

transmitting a first signaling, the first signaling being used for determining a first time-frequency resource block set and a second time-frequency resource block set;

receiving a first signal, a first reference signal and a first demodulation reference signal in the first time-frequency resource block set; and receiving a second signal, a second reference signal and a second demodulation reference signal in the second time-frequency resource block set;

herein, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

According to one aspect of the present disclosure, the above method is characterized in that the third antenna port and the first antenna port are QCL, the fourth antenna port and the second antenna port are QCL; frequency-domain resources occupied by the third antenna port belong to frequency-domain resources occupied by the first antenna port, and frequency-domain resources occupied by the fourth antenna port belong to frequency-domain resources occupied by the second antenna port.

According to one aspect of the present disclosure, the above method is characterized in comprising:

transmitting a first information block;

herein, the first information block is used for indicating a bandwidth threshold set, the bandwidth threshold set is used for determining T bandwidth set(s), and the T bandwidth set(s) corresponds(respectively correspond) to T frequency-domain density(densities), T being a positive integer; a scheduling bandwidth of the first signal is used for determining a first frequency-domain density, the first frequency-domain density is one of the T frequency-domain density(densities), a scheduling bandwidth of the second signal is used for determining a second frequency-domain density, the second frequency-domain density is one of the T frequency-domain density(densities), the first frequency-domain density is used for determining frequency-domain resources occupied by the first reference signal, and the second frequency-domain density is used for determining frequency-domain resources occupied by the second reference signal.

According to one aspect of the present disclosure, the above method is characterized in comprising:

transmitting a second information block;

herein, the second information block is used for indicating an MCS threshold set, the MCS threshold set is used for determining S MCS index set(s), and the S MCS index set(s) corresponds(respectively correspond) to S time-domain density(densities), S being a positive integer; an MCS index of the first signal is used for determining a first time-domain density, the first time-domain density is one of the S time-domain density(densities), an MCS index of the second signal is used for determining a second time-domain density, the second time-domain density is one of the S time-domain density(densities), the first time-domain density is used for determining time-domain resources occupied by the first reference signal, and the second time-domain density is used for determining time-domain resources occupied by the second reference signal.

According to one aspect of the present disclosure, the above method is characterized in that the first signaling is used for indicating a first index and a second index, the first index is used for determining a QCL parameter that transmits the first signal, and the second index is used for determining a QCL parameter that transmits the second signal.

According to one aspect of the present disclosure, the above method is characterized in that P1 antenna port number(s) is(are) port number(s) of P1 antenna port(s) that transmits(transmit) the first reference signal, the third antenna port is one of the P1 antenna port(s), and the target antenna port number is one of the P1 antenna port number(s); P2 antenna port number(s) is(are) port number(s) of P2 antenna port(s) that transmits(transmit) the second reference signal, the fourth antenna port is one of the P2 antenna port(s), and the target antenna port number is one of the P2 antenna port number(s); P1 is a positive integer, and P2 is a positive integer.

According to one aspect of the present disclosure, the above method is characterized in that the P1 is equal to 1, the P2 is equal to 1, the P1 antenna port number is the target antenna port number, the third antenna port is the P1 antenna port, the P2 antenna port number is the target antenna port number, and the fourth antenna port is the P2 antenna port; or, the first signaling is used for determining the P1 and the P2.

The present disclosure provides a first node for wireless communications, comprising:

a first receiver, receiving a first signaling, the first signaling being used for determining a first time-frequency resource block set and a second time-frequency resource block set; and a first transmitter, transmitting a first signal, a first reference signal and a first demodulation reference signal in the first time-frequency resource block set; and transmitting a second signal, a second reference signal and a second demodulation reference signal in the second time-frequency resource block set;

herein, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

The present disclosure provides a second node for wireless communications, comprising:

a second transmitter, transmitting a first signaling, the first signaling being used for determining a first time-frequency resource block set and a second time-frequency resource block set; and a second receiver, receiving a first signal, a first reference signal and a first demodulation reference signal in the first time-frequency resource block set; and receiving a second signal, a second reference signal and a second demodulation reference signal in the second time-frequency resource block set;

herein, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

In one embodiment, the method in the present disclosure is advantageous in the following aspects:

the present disclosure proposes a scheme for designing PTRSs in transmissions of multiple TRPs, antenna panels or beams.

in the method proposed in the present disclosure, PTRSs of two data transmissions correspond to a same port number, a signaling is scheduled for determining DMRS port numbers respectively associated with PTRS port numbers of the two data transmissions.

in the method proposed in the present disclosure, the two data transmissions can be performed for different TRPs, antenna panels or beams, so that a most appropriate DMRS port number can be associated with a PTRS port number of each data transmission.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
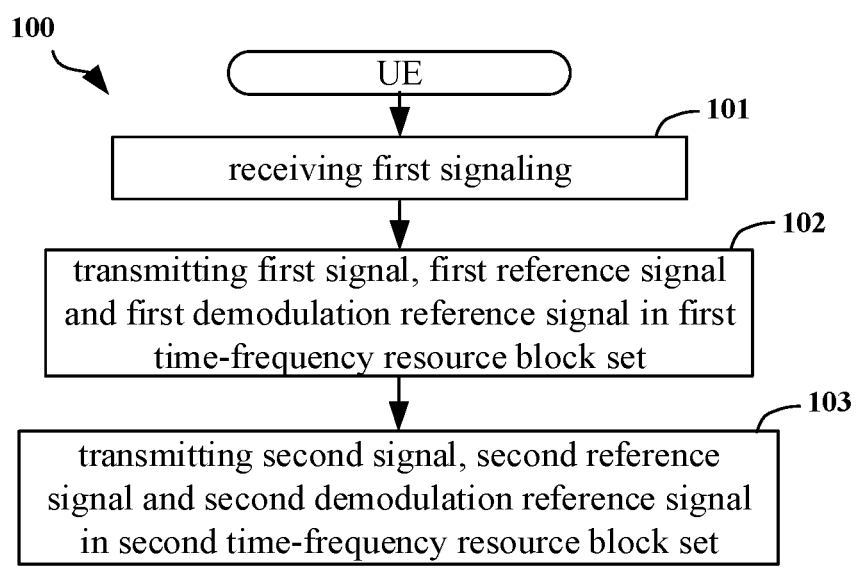
FIG. 1 illustrates a flowchart of a first signaling, a first signal, a first reference signal, a first demodulation reference signal, a second signal, a second reference signal and a second demodulation reference signal according to one embodiment of the present disclosure.

Embodiment 1 illustrates a flowchart of a first signaling, a first signal, a first reference signal, a first demodulation reference signal, a second signal, a second reference signal and a second demodulation reference signal according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, the first node in the present disclosure receives a first signaling in step 101; transmits a first signal, a first reference signal and a first demodulation reference signal in the first time-frequency resource block set in step S102; transmits a second signal, a second reference signal and a second demodulation reference signal in the second time-frequency resource block set in step 103; herein, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

In one embodiment, the first signaling is dynamically configured.

In one embodiment, the first signaling is a physical-layer signaling.

In one embodiment, the first signaling is a DCI signaling.

In one embodiment, the first signaling is a DCI signaling for UpLink Grant, and the operation action is transmitting.

In one embodiment, the first signaling is transmitted on a downlink physical layer control channel (i.e., a downlink channel that is only capable of carrying a physical layer signaling).

In one embodiment, the downlink physical-layer control channel is a Physical Downlink Control CHannel(PDCCH).

In one embodiment, the downlink physical-layer control channel is a short PDCCH (sPDCCH).

In one embodiment, the downlink physical layer control channel is a Narrow Band PDCCH (NB-PDCCH).

In one embodiment, the operation action is transmitting, the first signaling is DCI format 0_0, and the specific meaning of the DCI format 0_0 can be found in 3GPP TS38.212, section 7.3.1.1.

In one embodiment, the operation action is transmitting, the first signaling is DCI format 0_1, and the specific meaning of the DCI format 0_1 can be found in 3GPP TS38.212, section 7.3.1.1.

In one embodiment, the operation action is transmitting, the first signaling is DCI format 0_2, and the specific meaning of the DCI format 0_2 can be found in 3GPP TS38.212, section 7.3.1.1.

In one embodiment, the first signaling indicates scheduling information of the first signal and scheduling information of the second signal.

In one embodiment, the scheduling information of the first signal comprises at least one of occupied time-domain resources, occupied frequency-domain resources, a Modulation and Coding Scheme(MCS), configuration information of DMRS, a Hybrid Automatic Repeat reQuest(HARQ) process number, a Redundancy Version(RV), a New Data Indicator(NDI), a transmission antenna port, a corresponding Transmission Configuration Indicator(TCI) state, a corresponding multi-antenna related transmission or a corresponding multi-antenna related reception.

In one subembodiment of the above embodiment, configuration information of the first demodulation reference signal comprises configuration information of the DMRS in the scheduling information of the first signal.

In one subembodiment of the above embodiment, configuration information of the DMRS comprised in the scheduling information of the first signal comprises at least one of a Reference Signal(RS) sequence, a mapping mode, a DMRS type, occupied time-domain resources, occupied frequency-domain resources, occupied code-domain resources, a cyclic shift or an Orthogonal Cover Code (OCC).

In one embodiment, the scheduling information of the second signal comprises at least one of occupied time-domain resources, occupied frequency-domain resources, an MCS, configuration information of DMRS, a HARQ process number, an RV, an NDI, a transmission antenna port, a corresponding TCI state, a corresponding multi-antenna related transmission or a corresponding multi-antenna related reception.

In one subembodiment of the above embodiment, configuration information of the second demodulation reference signal comprises configuration information of the DMRS in the scheduling information of the second signal.

In one subembodiment of the above embodiment, configuration information of the DMRS comprised in the scheduling information of the second signal comprises at least one of an RS sequence, a mapping mode, a DMRS type, occupied time-domain resources, occupied frequency-domain resources, occupied code-domain resources, a cyclic shift or an OCC.

In one embodiment, the multi-antenna related reception refers to Spatial Rx parameters.

In one embodiment, the multi-antenna related reception refers to a reception beam.

In one embodiment, the multi-antenna related reception refers to a reception beamforming matrix.

In one embodiment, the multi-antenna related reception refers to a reception analog beamforming matrix.

In one embodiment, the multi-antenna related reception refers to a reception analog beamforming vector.

In one embodiment, the multi-antenna related reception refers to a reception beamforming vector.

In one embodiment, the multi-antenna related reception refers to reception spatial filtering.

In one embodiment, the multi-antenna related transmission refers to Spatial Tx parameters.

In one embodiment, the multi-antenna related transmission refers to a transmission beam.

In one embodiment, the multi-antenna related transmission refers to a transmission beamforming matrix.

In one embodiment, the multi-antenna related transmission refers to a transmission analog beamforming matrix.

In one embodiment, the multi-antenna related transmission refers to a transmission analog beamforming vector.

In one embodiment, the multi-antenna related transmission refers to a transmission beamforming vector.

In one embodiment, the multi-antenna related transmission refers to transmission spatial filtering.

In one embodiment, the Spatial Tx parameters include one or more of a transmission antenna port, a transmission antenna port group, a transmission beam, a transmission analog beamforming matrix, a transmission analog beamforming vector, a transmission beamforming matrix, a transmission beamforming vector and transmission spatial filtering.

In one embodiment, Spatial Rx parameters includes one or more of a reception beam, a reception analog beamforming matrix, a reception analog beamforming vector, a reception beamforming matrix, a reception beamforming vector and reception spatial filtering.

In one embodiment, the first time-frequency resource block set consists of a positive integer number of Resource Element(s), and the second time-frequency resource block set consists of a positive integer number of RE(s).

In one embodiment, any RE in the first time-frequency resource block set does not belong to the second time-frequency resource block set.

In one embodiment, the first time-frequency resource block set comprises a positive integer number of time-frequency resource block(s), the second time-frequency resource block set comprises a positive integer number of time-frequency resource block(s), and magnitudes of frequency-domain resources occupied by any two time-frequency resource blocks in the first time-frequency resource block set and the second time-frequency resource set are the same.

In one subembodiment of the above embodiment, the magnitude of the occupied frequency-domain resources is a number of sub-carriers occupied in frequency domain.

In one subembodiment of the above embodiment, the magnitude of the occupied frequency-domain resources is a number of Resource Blocks occupied in frequency domain.

In one subembodiment of the above embodiment, any time-frequency resource block in the first time-frequency resource block set comprises an RB in frequency domain, and any time-frequency resource block in the second time-frequency resource block set comprises an RB in frequency domain.

In one subembodiment of the above embodiment, the first time-frequency resource block set comprises a positive integer number of time-frequency resource blocks that are orthogonal in frequency domain, and the second time-frequency resource block set comprises a positive integer number of time-frequency resource blocks that are orthogonal in frequency domain.

In one embodiment, the first time-frequency resource block set comprises a positive integer number of RB(s) in frequency domain, and the second time-frequency resource block set comprises a positive integer number of RB(s) in frequency domain.

In one embodiment, the first time-frequency resource block comprises a positive integer number of subcarrier(s) in frequency domain, and the second time-frequency resource block set comprises a positive integer number of sub-carrier(s) in frequency domain.

In one embodiment, the first time-frequency resource block set comprises a positive integer number of multicarrier symbol(s) in time-domain, and the second time-frequency resource block set comprises a positive integer number of multicarrier symbol(s) in time domain.

In one embodiment, the multicarrier symbol is an Orthogonal Frequency Division Multiplexing (OFDM) symbol.

In one embodiment, the multicarrier symbol is a Single-Carrier Frequency-Division Multiple Access (SC-FDMA) symbol.

In one embodiment, the multicarrier symbol is a Filter Bank Multi-Carrier (FBMC) symbol.

In one embodiment, time-domain resources occupied by the first time-frequency resource block set comprise a positive integer number of multicarrier symbol(s), and time-domain resources occupied by the second time-frequency resource set comprise a positive integer number of multi-carrier symbol(s).

In one embodiment, frequency-domain resources occupied by the first time-frequency resource block set comprise a positive integer number of sub-carrier(s), and frequency-domain resources occupied by the second time-frequency resource block set comprise a positive integer number of subcarrier(s).

In one embodiment, frequency-domain resources occupied by the first time-frequency resource block set comprise a positive integer number of RB(s), and frequency-domain resources occupied by the second time-frequency resource block comprise a positive integer number of RB(s).

In one embodiment, the first time-frequency resource block set and the second time-frequency resource block set are orthogonal in time domain.

In one embodiment, the first time-frequency resource block set and the second time-frequency resource block set are orthogonal in frequency domain.

In one embodiment, the first time-frequency resource block set and the second time-frequency resource block set are orthogonal in time domain, and an end time of the first time-frequency resource block set is earlier than a start time of the second time-frequency resource block set in time domain.

In one embodiment, the first time-frequency resource block set and the second time-frequency resource block set are orthogonal in frequency domain, time-domain resources occupied by the first time-frequency resource block set are the same as time-domain resources occupied by the second time-frequency resource block set.

In one embodiment, the first signaling is used for determining K time-frequency resource block sets, any two of the K time-frequency resource block sets are orthogonal, the K time-frequency resource block sets comprise a first time-frequency resource block set and a second time-frequency resource block set, K being a positive integer greater than 1.

In one embodiment, the first signaling comprises a first field and a second field, the first field and the second field comprised in the first signaling are used for indicating the first time-frequency resource block set and the second time-frequency resource block set; the first field comprised in the first signaling comprises a positive integer number of bit(s), and the second field comprised in the first signaling comprises a positive integer number of bit(s).

In one subembodiment of the above embodiment, the first field comprised in the first signaling indicates the first time-frequency resource block set and frequency-domain resources occupied by the second time-frequency resource block set.

In one subembodiment of the above embodiment, the first field comprised in the first signaling indicates frequency-domain resources occupied by the first time-frequency resource block set and frequency-domain resources occupied by the second time-frequency resource block set.

In one subembodiment of the above embodiment, the first field comprised in the first signaling indicates frequency-domain resources occupied by the first time-frequency resource block set, and frequency-domain resources occupied by the second time-frequency resource block set are related to the frequency-domain resources occupied by the first time-frequency resource block set.

In one subembodiment of the above embodiment, the first field comprised in the first signaling indicates frequency-domain resources occupied by the first time-frequency resource block set, and frequency-domain resources occupied by the second time-frequency resource block set are the same as the frequency-domain resources occupied by the first time-frequency resource block set.

In one subembodiment of the above embodiment, the second field comprised in the first signaling indicates time-domain resources occupied by the first time-frequency resource block set and time-domain resources occupied by the second time-frequency resource block set.

In one subembodiment of the above embodiment, the operation action is transmitting, the first field and the second field comprised in the first signaling are respectively Frequency-domain resource assignment and Time-domain resource assignment, and specific meanings of the Frequency-domain resource assignment and the Time-domain resource assignment can be found in 3GPP TS38.214, section 6.1.2.

In one embodiment, the first signaling comprises a first field and a second field, the first field and the second field comprised in the first signaling are used for indicating the first time-frequency resource block set, the first time-frequency resource block set being used for determining the second time-frequency resource block set; the first field comprised in the first signaling comprises a positive integer number of bit(s), and the second field comprised in the first signaling comprises a positive integer number of bit(s).

In one subembodiment of the above embodiment, the first time-frequency resource block set and the second time-frequency resource block set are orthogonal in time domain, and the second time-frequency resource block set and the first time-frequency resource block set are consecutive in time domain.

In one subembodiment of the above embodiment, the first time-frequency resource block set and the second time-frequency resource block set are orthogonal in time domain, and a starting multicarrier symbol of the second time-frequency resource block set and an ending multicarrier symbol of the first time-frequency resource block set are consecutive in time domain.

In one subembodiment of the above embodiment, the first time-frequency resource block set and the second time-frequency resource block set are orthogonal in time domain, and a time-domain offset between time-domain resources occupied by the second time-frequency resource block set and time-domain resources occupied by the first time-frequency resource block set is predefined.

In one subembodiment of the above embodiment, the first time-frequency resource block set and the second time-frequency resource block set are orthogonal in time domain, and a time-domain offset between time-domain resources occupied by the second time-frequency resource block set and time-domain resources occupied by the first time-frequency resource block set is configured by a higher-layer signaling.

In one subembodiment of the above embodiment, the first time-frequency resource block set and the second time-frequency resource block set are orthogonal in frequency domain, and the second time-frequency resource block set and the first time-frequency resource block set are consecutive in frequency domain.

In one subembodiment of the above embodiment, the first time-frequency resource block and the second time-frequency resource block set are orthogonal in frequency domain, and a starting subcarrier of the second time-frequency resource block set and an ending subcarrier of the first time-frequency resource block set are consecutive in frequency domain.

In one subembodiment of the above embodiment, the first time-frequency resource block set and the second time-frequency resource block set are orthogonal in frequency domain, and a frequency-domain offset between frequency-domain resources occupied by the second time-frequency resource block set and frequency-domain resources occupied by the first time-frequency resource block set is predefined.

In one subembodiment of the above embodiment, the first time-frequency resource block set and the second time-frequency resource block set are orthogonal in frequency domain, and a frequency-domain offset between frequency-domain resources occupied by the second time-frequency resource block set and frequency-domain resources occupied by the first time-frequency resource block set is configured by a higher-layer signaling.

In one subembodiment of the above embodiment, the first field comprised in the first signaling indicates frequency-domain resources occupied the first time-frequency resource block set.

In one subembodiment of the above embodiment, the second field comprised in the first signaling indicates time-domain resources occupied the first time-frequency resource block set.

In one subembodiment of the above embodiment, the operation action is transmitting, the first field and the second field comprised in the first signaling are respectively Frequency domain resource assignment and Time domain resource assignment, and specific meanings of the Frequency domain resource assignment and the Time domain resource assignment can be found in 3GPP TS38.214, section 6.1.2.

In one embodiment, the first signal carries a first bit block, the second signal carries a second bit block, the first bit block comprises a positive integer number of bit(s), and the second bit block comprises a positive integer number of bit(s).

In one subembodiment of the above embodiment, the first bit block comprises a Transport Block(TB), and the second bit block comprises a TB.

In one subembodiment of the above embodiment, the first bit block comprises a Code Block Group(CBG), and the second bit block comprises a CBG.

In one subembodiment of the above embodiment, the first bit block comprises a positive integer number of TB(s), and the second bit block comprises a positive integer number of TB(s).

In one subembodiment of the above embodiment, the first bit block comprises a positive integer number of CBG(s), and the second bit block comprises a positive integer number of CBG(s).

In one subembodiment of the above embodiment, the first bit block and the second bit block are the same.

In one subembodiment of the above embodiment, the first bit block and the second bit block are different.

In one subembodiment of the above embodiment, the first bit block and the second bit block are the same, the first signal and the second signal respectively comprise two repetitive transmissions of the first bit block.

In one subembodiment of the above embodiment, the first bit block and the second bit block are the same, the first signal comprises a transmission of the first bit block, and the second signal comprises a transmission of the first bit block.

In one embodiment, a given signal is obtained by a given bit block sequentially subjected to CRC Insertion, Channel Coding, Rate Matching, Scrambling, Modulation, Layer Mapping, Precoding, Mapping to Resource Element, OFDM Baseband Signal Generation, and Modulation and Upconversion.

In one subembodiment of the above embodiment, the given bit block is the first bit block, and the given signal is the first signal.

In one subembodiment of the above embodiment, the given bit block is the second bit block, and the given signal is the second signal.

In one embodiment, a given signal is obtained by a given bit block sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation and Modulation and Upconversion.

In one subembodiment of the above embodiment, the given bit block is the first bit block, and the given signal is the first signal.

In one subembodiment of the above embodiment, the given bit block is the second bit block, and the given signal is the second signal.

In one embodiment, a given signal is obtained by a given bit block sequentially subjected to CRC Insertion, Segmentation, CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one subembodiment of the above embodiment, the given bit block is the first bit block, and the given signal is the first signal.

In one subembodiment of the above embodiment, the given bit block is the second bit block, and the given signal is the second signal.

In one embodiment, a given signal is obtained by a given bit block sequentially subjected to CRC Insertion, Channel Coding, Rate Matching, Scrambling, Modulation, Layer Mapping, Precoding, Mapping to Resource Element, OFDM Baseband Signal Generation, and Modulation and Upconversion.

In one subembodiment of the above embodiment, the given bit block is the first bit block, and the given signal is the first signal.

In one subembodiment of the above embodiment, the given bit block is the second bit block, and the given signal is the second signal.

In one embodiment, a given signal is obtained by a given bit block sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation and Modulation and Upconversion.

In one subembodiment of the above embodiment, the given bit block is the first bit block, and the given signal is the first signal.

In one subembodiment of the above embodiment, the given bit block is the second bit block, and the given signal is the second signal.

In one embodiment, a given signal is obtained by a given bit block sequentially subjected to CRC Insertion, Segmentation, CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one subembodiment of the above embodiment, the given bit block is the first bit block, and the given signal is the first signal.

In one subembodiment of the above embodiment, the given bit block is the second bit block, and the given signal is the second signal.

In one embodiment, the first signal comprises data, and the second signal comprises data.

In one embodiment, the first demodulation reference signal comprises a DMRS, and the second demodulation reference signal comprises a DMRS.

In one embodiment, a channel estimated by a measurement performed on the first demodulation reference signal is used for a demodulation of the first signal, and a channel estimated by a measurement performed on the second demodulation reference signal is used for a demodulation of the second signal.

In one embodiment, a number of antenna ports of the first demodulation reference signal is the same as a number of antenna ports of the second demodulation reference signal.

In one embodiment, a number of antenna ports of the first demodulation reference signal is different from a number of antenna ports of the second demodulation reference signal.

In one embodiment, a number of antenna ports of the first demodulation reference signal is related to a number of antenna ports of the second demodulation reference signal.

In one embodiment, a number of antenna ports of the first demodulation reference signal is unrelated to a number of antenna ports of the second demodulation reference signal.

In one embodiment, a transmission channel of the first signal is an UpLink Shared Channel, and a transmission channel of the second signal is a UL-SCH.

In one embodiment, the first signal is transmitted on a UL physical-layer data channel(i.e., a UL channel capable of carrying physical-layer data), the second signal is transmitted on a UL physical-layer data channel(i.e., a UL channel capable of carrying physical-layer data).

In one embodiment, the UL physical-layer data channel is a Physical Uplink Shared CHannel (PUSCH).

In one subembodiment, the UL physical-layer data channel is a short PUSCH (sPUSCH).

In one embodiment, the UL physical-layer data channel is a Narrow Band PUSCH (NB-PUSCH).

In one embodiment, a first reference signal comprises a PTRS, and the second reference signal comprises a PTRS.

In one embodiment, a number of antenna port of the first reference signal is equal to 1.

In one embodiment, a number of antenna ports of the first reference signal is greater than 1.

In one embodiment, a number of antenna port of the second reference signal is equal to 1.

In one embodiment, a number of antenna ports of the second reference signal is greater than 1.

In one embodiment, a number of antenna ports of the first reference signal is the same as a number of antenna ports of the second reference signal.

In one embodiment, a number of antenna ports of the first reference signal is different from a number of antenna ports of the second reference signal.

In one embodiment, a number of antenna ports of the first reference signal is related to a number of antenna ports of the second reference signal.

In one embodiment, a number of antenna ports of the first reference signal is unrelated to a number of antenna ports of the second reference signal.

In one embodiment, the first time-frequency resource block set comprises N1 time-frequency resource block(s), the second time-frequency resource block set comprises N2 time-frequency resource block(s), N1 and N2 both being positive integers; the first reference signal is transmitted in M1 time-frequency resource block(s) in the N1 time-frequency resource block(s), and the second reference signal is transmitted in M2 time-frequency resource block(s) in the N2 time-frequency resource block(s), M1 being a positive integer no greater than N1, M2 being a positive integer no greater than N2.

In one subembodiment of the above embodiment, time-domain resources occupied by the first reference signal in each of the M1 time-frequency resource block(s) are the same, and time-domain resources occupied by the second reference signal in each of the M2 time-frequency resource block(s) are the same.

In one subembodiment of the above embodiment, multi-carrier symbols occupied by the first reference signal in each of the M1 time-frequency resource block(s) are the same, and multicarrier symbols occupied by the second reference signal in each of the M2 time-frequency resource block(s) are the same.

In one subembodiment of the above embodiment, a first frequency-domain density is used for determining frequency-domain resources occupied by the first reference signal, a second frequency-domain density is used for determining frequency-domain resources occupied by the second reference signal.

In one subembodiment of the above embodiment, a first frequency-domain density is used for determining a subcarrier occupied by the first reference signal, a second frequency-domain density is used for determining a subcarrier occupied by the second reference signal.

In one subembodiment of the above embodiment, a first frequency-domain density is used for determining the M1 time-frequency resource block(s), and frequency-domain resources occupied by the first reference signal belong to frequency-domain resources occupied by the M1 time-frequency resource block(s); a second frequency-domain density is used for determining the M2 time-frequency resource block(s), frequency-domain resources occupied by the second reference signal belong to frequency-domain resources occupied by the M2 time-frequency resource block(s).

In one subembodiment of the above embodiment, a first time-domain density is used for determining time-domain resources occupied by the first reference signal, and a second time-domain density is used for determining time-domain resources occupied by the second reference signal.

In one subembodiment of the above embodiment, a first time-domain density is used for determining a multicarrier symbol occupied by the first reference signal, and a second time-domain density is used for determining a multicarrier symbol occupied by the second reference signal.

In one subembodiment of the above embodiment, time-frequency resources occupied by the first reference signal belong to the M1 time-frequency resource block(s), and time-frequency resources occupied by the second reference signal belong to the M2 time-frequency resource block(s).

In one subembodiment of the above embodiment, the first reference signal only occupies one subcarrier in frequency domain in each of the M1 time-frequency resource block(s), and the second reference signal only occupies one subcarrier in frequency domain in each of the M2 time-frequency resource block(s).

In one embodiment, the target antenna port number is a non-negative integer.

In one embodiment, the target antenna port number is 0.

In one embodiment, the target antenna port number is one of 0 or 1.

In one embodiment, the target antenna port number is one of 0, 1, 2 or 3.

In one embodiment, the third antenna port being associated with the first antenna port comprises that the third antenna port can used for compensating phase noise of the first demodulation reference signal; the fourth antenna port being associated with the second antenna port comprises that the fourth antenna port can used for compensating phase noise of the second demodulation reference signal.

In one embodiment, the third antenna port being associated with the first antenna port comprises that the third antenna port can used for compensating phase noise of the first signal; the fourth antenna port being associated with the second antenna port comprises that the fourth antenna port can used for compensating phase noise of the second signal.

In one embodiment, the third antenna port being associated with the first antenna port comprises that the third antenna port and the first antenna port are transmitted by a same antenna group and correspond to a same precoding vector; the fourth antenna port being associated with the second antenna port comprises that the fourth antenna port and the second antenna port are transmitted by a same antenna group and correspond to a same precoding vector; and the antenna group comprises a positive integer number of antenna(s).

In one embodiment, the third antenna port being associated with the first antenna port comprises that small-scale channel fading parameters that the first antenna port goes through can be used for inferring small-scale channel fading parameters that the third antenna port goes through; the fourth antenna port being associated with the second antenna port comprises that small-scale channel fading parameters that the second antenna port goes through can be used for inferring small-scale channel fading parameters that the fourth antenna port goes through.

In one embodiment, a first antenna port number group comprises all antenna port numbers of the first demodulation reference signal, and a second port number group comprises all antenna port numbers of the second demodulation reference signal; the first signaling comprises a third field, and the third field comprised in the first signaling indicates the first antenna port number group.

In one subembodiment of the above embodiment, the first port number group and the second port number group are different; the first signaling comprises a third field, and the third field comprised in the first signaling indicates the first antenna port number group and the second port number group.

In one subembodiment of the above embodiment, any port number in the first port number group does not belong to the second port number group; the first signaling comprises a third field, and the third field comprised in the first signaling indicates the first antenna port number group and the second port number group.

In one subembodiment of the above embodiment, the first port number group and the second port number group are the same; the first signaling comprises a third field, and the third field comprised in the first signaling indicates the first antenna port number group.

In one subembodiment of the above embodiment, the third field comprised in the first signaling comprises a positive integer number of bit(s).

In one subembodiment of the above embodiment, the third field comprised in the first signaling is an Antenna ports field, and the specific meaning of the Antenna ports field can be found in 3GPP TS38.212, section 7.3.1.1.

In one embodiment, the first signaling respectively indicates a port number of the first antenna port and a port number of the second antenna port.

In one embodiment, a port number of the first antenna port and a port number of the second antenna port are indicated independently by the first signaling.

In one embodiment, a port number of the first antenna port and a port number of the second antenna port are the same or different.

In one embodiment, a port number of the first antenna port and a port number of the second antenna port are the same.

In one embodiment, a port number of the first antenna port and a port number of the second antenna port are different.

In one embodiment, for the target antenna port number, the first signaling is used for indicating a port number of the first antenna port and a port number of the second antenna port.

In one embodiment, for the target antenna port number, the first signaling explicitly indicates a port number of the first antenna port and a port number of the second antenna port.

In one embodiment, the first signaling implicitly indicates a port number of the first antenna port and a port number of the second antenna port.

In one embodiment, the first signaling comprises a fourth field, for the target antenna port number, the fourth field comprised in the first signaling indicates a port number of the first antenna port and a port number of the second antenna port.

In one embodiment, the first signaling is used for indicating a port number of the first antenna port and a port number of the second antenna port.

In one embodiment, the first signaling explicitly indicates a port number of the first antenna port and a port number of the second antenna port.

In one embodiment, the first signaling comprises a fourth field, the fourth field comprised in the first signaling indicates a port number of the first antenna port and a port number of the second antenna port.

In one subembodiment of the above embodiment, the fourth field comprised in the first signaling is a PTRS-DMRS association field, and the specific meaning of the PTRS-DMRS association field can be found in 3GPP TS38.212, section 7.3.1.1.

In one embodiment, the first signaling implicitly indicates a port number of the first antenna port and a port number of the second antenna port.

In one embodiment, the first signaling is used for determining that a port number of the first antenna port and a port number of the second antenna port both correspond to the target antenna port number.

In one embodiment, the first signaling is used for indicating that a port number of the first antenna port and a port number of second antenna port both correspond to the target antenna port number.

In one embodiment, the first signaling explicitly indicates that a port number of first antenna port and a port number of second antenna port both correspond to the target antenna port number.

In one embodiment, the first signaling implicitly indicates that a port number of first antenna port and a port number of second antenna port both correspond to the target antenna port number.

In one embodiment, the first signaling comprises a fourth field, the fourth field comprised in the first signaling indicates that a port number of first antenna port and a port number of second antenna port both correspond to the target antenna port number.

In one subembodiment of the above embodiment, the fourth field comprised in the first signaling is a PTRS-DMRS association field, and the specific meaning of the PTRS-DMRS association field can be found in 3GPP TS38.212, section 7.3.1.1.

In one embodiment, the first signaling comprises a fourth field, and the fourth field comprised in the first signaling indicates that the target antenna port number is related to both the first antenna port and the second antenna port.

In one subembodiment of the above embodiment, the fourth field comprised in the first signaling is a PTRS-DMRS association field, and the specific meaning of the PTRS-DMRS association field can be found in 3GPP TS38.212, section 7.3.1.1.

In one embodiment, the first signaling comprises a fourth field, and the fourth field comprised in the first signaling indicates that an antenna port corresponding to the target antenna port is related to both the first antenna port and the second antenna port.

In one subembodiment of the above embodiment, the fourth field comprised in the first signaling is a PTRS-DMRS association field, and the specific meaning of the PTRS-DMRS association field can be found in 3GPP TS38.212, section 7.3.1.1.

Embodiment 2

Figure 2:
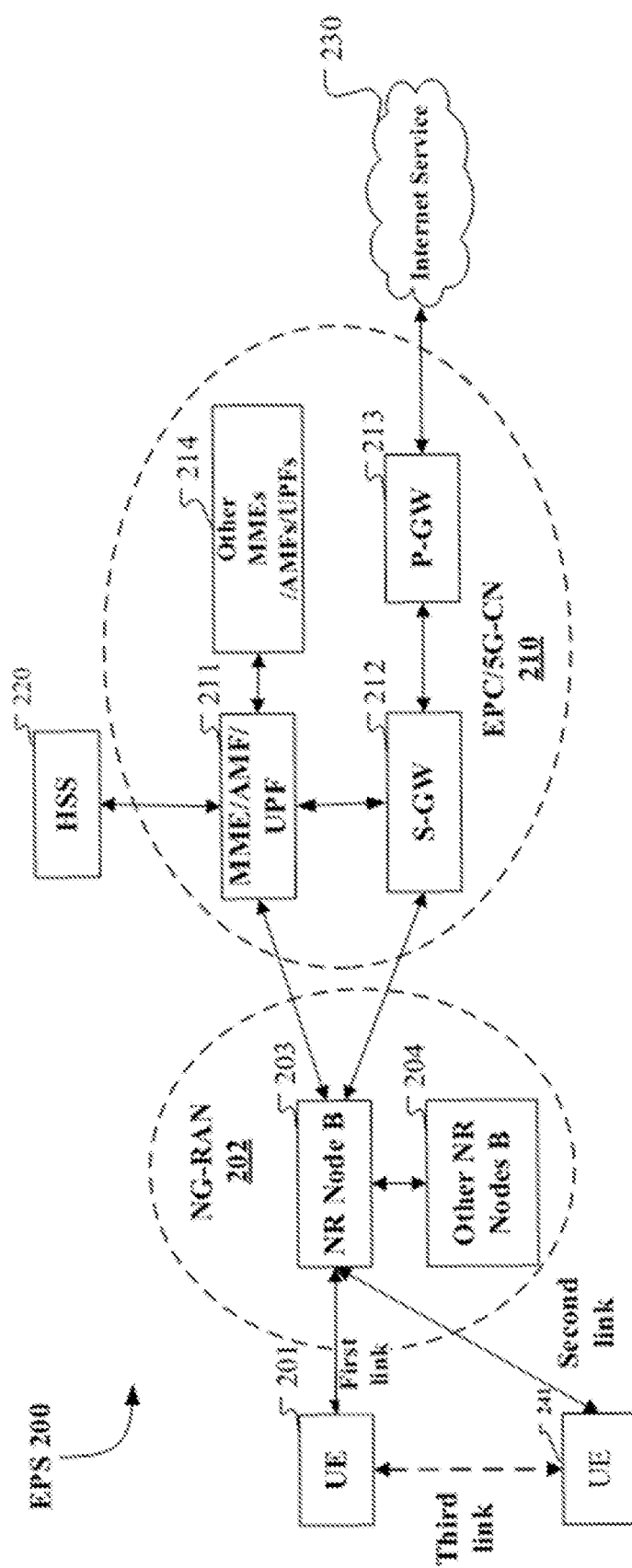
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network(EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a TRP or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrowband Internet of Things(IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field(AMF)/User Plane Function(UPF) 211, other MMEs/AMFs/UPFs 214, a Service Gateway(S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

Embodiment 3

Figure 3:
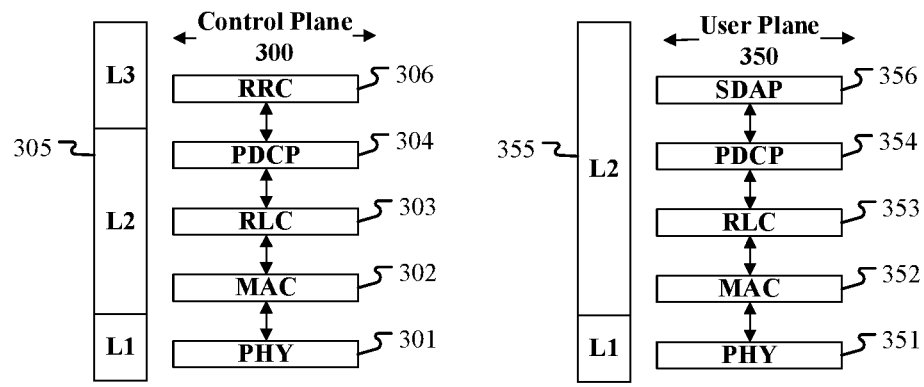
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node(UE, a RSU in gNB or V2X) and a second communication node (gNB, a RSU in UE or V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3(L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block in the present disclosure is generated by the RRC sublayer 306.

In one embodiment, the first information block in the present disclosure is generated by the MAC sublayer 302.

In one embodiment, the first information block in the present disclosure is generated by the MAC sublayer 352.

In one embodiment, the second information block in the present disclosure is generated by the RRC sublayer 306.

In one embodiment, the second information block in the present disclosure is generated by the MAC sublayer 302.

In one embodiment, the second information block in the present disclosure is generated by the MAC sublayer 352.

In one embodiment, the first signaling in the present disclosure is generated by the PHY 301.

In one embodiment, the first signaling in the present disclosure is generated by the PHY 351.

In one embodiment, the first signal in the present disclosure is generated by the PHY 301.

In one embodiment, the first signal in the present disclosure is generated by the PHY 351.

In one embodiment, the second signal in the present disclosure is generated by the PHY 301.

In one embodiment, the second signal in the present disclosure is generated by the PHY 351.

In one embodiment, the first reference signal in the present disclosure is generated by the PHY 301.

In one embodiment, the first reference signal in the present disclosure is generated by the PHY 351.

In one embodiment, the second reference signal in the present disclosure is generated by the PHY 301.

In one embodiment, the second reference signal in the present disclosure is generated by the PHY 351.

In one embodiment, the first demodulation reference signal in the present disclosure is generated by the PHY 301.

In one embodiment, the first demodulation reference signal in the present disclosure is generated by the PHY 351.

In one embodiment, the second demodulation reference signal in the present disclosure is generated by the PHY 301.

In one embodiment, the second demodulation reference signal in the present disclosure is generated by the PHY 351.

Embodiment 4

Figure 4:
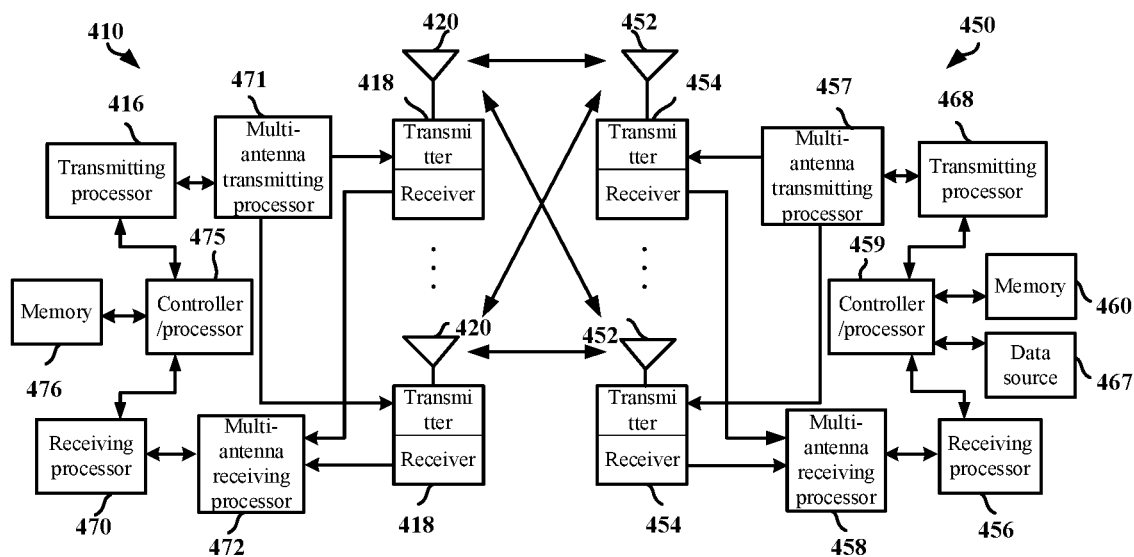
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is abase station.

In one subembodiment of the above embodiment, the first node is a relay node, and the second node is a base station.

In one subembodiment of the above embodiment, the second communication device 450 comprises: at least one controller/processor; and the at least one controller/processor is responsible for HARQ operation.

In one subembodiment of the above embodiment, the first communication device 410 comprises: at least one controller/processor; and the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling, the first signaling is used for determining a first time-frequency resource block set and a second time-frequency resource block set; transmits a first signal, a first reference signal and a first demodulation reference signal in the first time-frequency resource block set; and transmits a second signal, a second reference signal and a second demodulation reference signal in the second time-frequency resource block set; herein, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving a first signaling, the first signaling being used for determining a first time-frequency resource block set and a second time-frequency resource block set; transmitting a first signal, a first reference signal and a first demodulation reference signal in the first time-frequency resource block set; and transmitting a second signal, a second reference signal and a second demodulation reference signal in the second time-frequency resource block set; herein, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling, the first signaling is used for determining a first time-frequency resource block set and a second time-frequency resource block set; receives a first signal, a first reference signal and a first demodulation reference signal in the first time-frequency resource block set; and receives a second signal, a second reference signal and a second demodulation reference signal in the second time-frequency resource block set; herein, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting a first signaling, the first signaling being used for determining a first time-frequency resource block set and a second time-frequency resource block set; receiving a first signal, a first reference signal and a first demodulation reference signal in the first time-frequency resource block set; and receiving a second signal, a second reference signal and a second demodulation reference signal in the second time-frequency resource block set; herein, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first information block in the present disclosure.

In one embodiment, at least one of the antenna 420, the transmitter 418, the multi-antenna transmitting processor 471, the transmitting processor 416, the controller/processor 475, or the memory 476 is used to transmit the first information block in the present disclosure.

In one embodiment, at least one of the antenna 452, the receiver 454, the multi-antenna receiving processor 458, the receiving processor 456, the controller/processor 459, the memory 460, or the data source 467 is used to receive the second information block in the present disclosure.

In one embodiment, at least one of the antenna 420, the transmitter 418, the multi-antenna transmitting processor 471, the transmitting processor 416, the controller/processor 475, or the memory 476 is used to transmit the second information block in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling in the present disclosure.

In one embodiment, at least one of the antenna 420, the transmitter 418, the multi-antenna transmitting processor 471, the transmitting processor 416, the controller/processor 475, or the memory 476 is used to transmit the first signaling in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first signal, the first reference signal and the first demodulation reference signal in the present disclosure in the first time-frequency resource block set in the present disclosure.

In one embodiment, at least one of the antenna 420, the receiver 418, the multi-antenna receiving processor 472, the receiving processor 470, the controller/processor 475, or the memory 476 is used to receive the first signal, the first reference signal and the first demodulation reference signal in the present disclosure in the first time-frequency resource block set in the present disclosure.

In one embodiment, at least one of the antenna 452, the transmitter 454, the multi-antenna transmission processor 458, the transmitting processor 468, the controller/processor 459, the memory 460, or the data source 467 is used to transmit the second signal, the second reference signal and the second demodulation reference signal in the present disclosure in the second time-frequency resource block set in the present disclosure.

In one embodiment, at least one of the antenna 420, the receiver 418, the multi-antenna receiving processor 472, the receiving processor 470, the controller/processor 475, or the memory 476 is used to receive the second signal, the second reference signal and the second demodulation reference signal in the present disclosure in the second time-frequency resource block set in the present disclosure.

Embodiment 5

Figure 5:
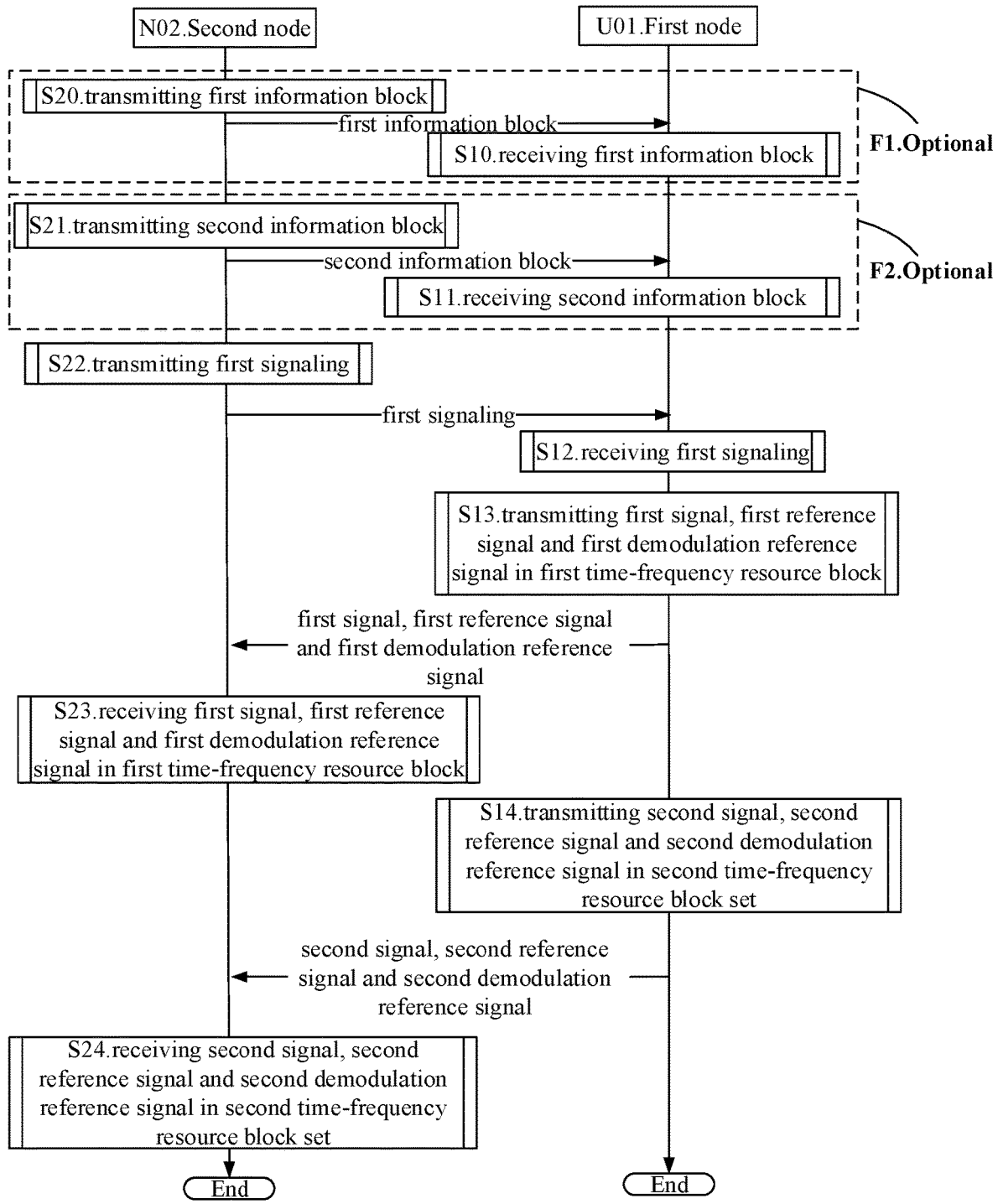
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first node U01 and a second node N02 are communication nodes that transmit via an air interface. In FIG. 5, boxes F1 and F2 are optional.

The first node U01 receives a first information block in step S10; receives a second information block in step S11; receives a first signaling in step S12; transmits a first signal, a first reference signal and a first demodulation reference signal in a first time-frequency resource block set in step S13; and transmits a second signal, a second reference signal and a second demodulation reference signal in a second time-frequency resource block set in step S14.

The second node N02 transmits a first information block in step S20; transmits a second information block in step S21; transmits a first signaling in step S22; receives a first signal, a first reference signal and a first demodulation reference signal in a first time-frequency resource block set in step S23; and receives a second signal, a second reference signal and a second demodulation reference signal in a second time-frequency resource block set in step S24.

In Embodiment 5, the first signaling is used by the first node U01 for determining a first time-frequency resource block set and a second time-frequency resource block set; the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used by the first node U01 for determining a port number of the first antenna port and a port number of the second antenna port. The first information block is used for indicating a bandwidth threshold set, the bandwidth threshold set is used by the first node U01 for determining T bandwidth set(s), the T bandwidth set(s) corresponds(respectively correspond) to T frequency-domain density(densities), T being a positive integer; a scheduling bandwidth of the first signal is used by the first node U01 for determining a first frequency-domain density, the first frequency-domain density is one of the T frequency-domain density(densities), a scheduling bandwidth of the second signal is used by the first node U01 for determining a second frequency-domain density, the second frequency-domain density is one of the T frequency-domain density(densities), the first frequency-domain density is used by the first node U01 for determining frequency-domain resources occupied by the first reference signal, and the second frequency-domain density is used by the first node U01 for determining frequency-domain resources occupied by the second reference signal. The second information block is used for indicating an MCS threshold set, the MCS threshold set is used by the first node U01 for determining S MCS index set(s), and the S MCS index set(s) corresponds (respectively correspond) to S time-domain density(densities), S being a positive integer; an MCS index of the first signal is used by the first node U01 for determining a first time-domain density, the first time-domain density is one of the S time-domain density(densities), an MCS index of the second signal is used by the first node U01 for determining a second time-domain density, the second time-domain density is one of the S time-domain density(densities), the first time-domain density is used by the first node U01 for determining time-domain resources occupied by the first reference signal, and the second time-domain density is used by the first node U01 for determining time-domain resources occupied by the second reference signal.

In one embodiment, the first information block is semi-statically configured.

In one embodiment, the first information block is carried by a higher-layer signaling.

In one embodiment, the first information block is carried by an RRC signaling.

In one embodiment, the first information block is carried by a MAC CE signaling.

In one embodiment, the first information block comprises one or more IEs in an RRC signaling.

In one embodiment, the first information block comprises one IE in an RRC signaling.

In one embodiment, the first information block comprises part of fields of an IE in an RRC signaling.

In one embodiment, the first information block comprises multiple IEs in an RRC signaling.

In one embodiment, the first information block comprises a frequencyDensity field in a PTRS-UplinkConfig IE in an RRC signaling, and specific meanings of the PTRS-UplinkConfig IE and the frequencyDensity field can be found in 3GPP TS38.331, section 6.3.2.

In one embodiment, the first information block explicitly indicates a bandwidth threshold set.

In one embodiment, the first information block implicitly indicates a bandwidth threshold set.

In one embodiment, the first frequency-domain density is a positive integer, and the second frequency-domain density is a positive integer.

In one embodiment, the first frequency-domain density is equal to 2 or 4, and the second frequency-domain density is equal to 2 or 4.

In one embodiment, the first frequency-domain density is pre-defined, and the second frequency-domain density is pre-defined.

In one embodiment, a scheduling bandwidth of the first signal is used by the first node U01 for determining a first frequency-domain density, and a scheduling bandwidth of the second signal is used by the first node U01 for determining a second frequency-domain density.

In one embodiment, the second information block is semi-statically configured.

In one embodiment, the second information block is carried by a higher-layer signaling.

In one embodiment, the second information block is carried by an RRC signaling.

In one embodiment, the second information block is carried by a MAC CE signaling.

In one embodiment, the second information block comprises one or more IEs in an RRC signaling.

In one embodiment, the second information block comprises one IE in an RRC signaling.

In one embodiment, the second information block comprises part of fields of an IE in an RRC signaling.

In one embodiment, the second information block comprises multiple IEs in an RRC signaling.

In one embodiment, the second information block and the first information block belong to a same IE in an RRC signaling.

In one embodiment, the second information block and the first information block both belong to a PTRS-UplinkConfig IE in an RRC signaling, and the specific meaning of the PTRS-UplinkConfig IE can be found in 3GPP TS38.331, section 6.3.2.

In one embodiment, the second information block comprises a timeDensity field in a PTRS-UplinkConfig IE in an RRC signaling, and specific meanings of the PTRS-UplinkConfig IE and the timeDensity field can be found in 3GPP TS38.331, section 6.3.2.

In one embodiment, the second information block explicitly indicates an MCS threshold set.

In one embodiment, the second information block implicitly indicates an MCS threshold set.

In one embodiment, the first time-domain is a positive integer, and the second time-domain is a positive integer.

In one embodiment, the first time-domain is equal to 1, 2 or 4, and the second time-domain density is equal to 1, 2 or 4.

In one embodiment, the first time-domain density is pre-defined, and the second time-domain density is pre-defined.

In one embodiment, an MCS index of the first signal is used by the first node U01 for determining a first time-domain density, and an MCS index of the second signal is used by the first node U01 for determining a second time-domain density.

Embodiment 6

Figure 6:
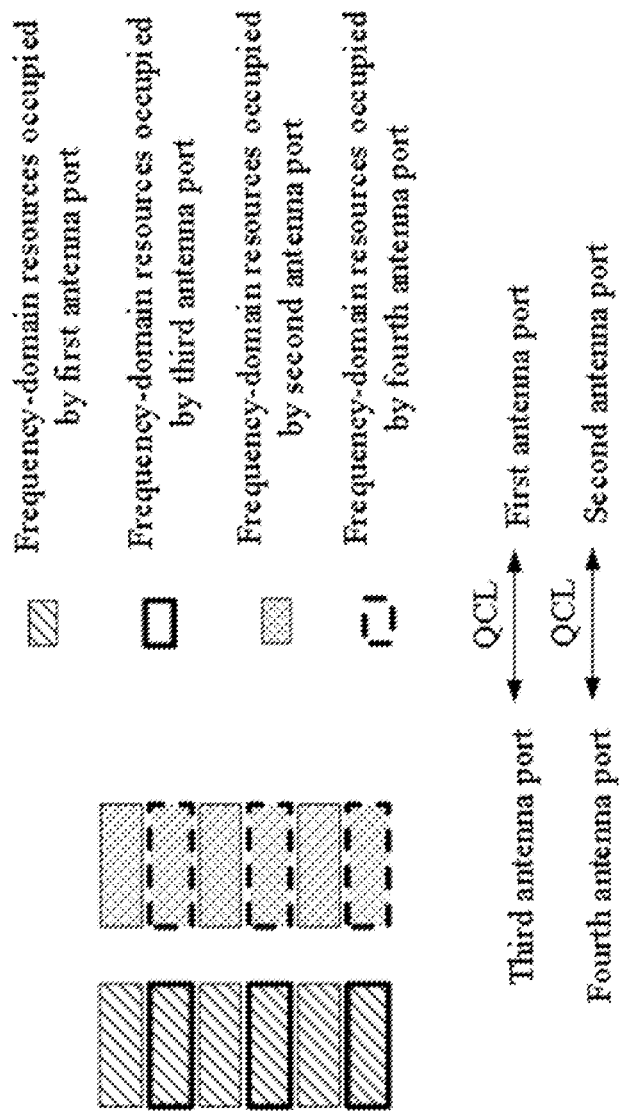
FIG. 6 illustrates a schematic diagram of a third antenna port associated with the first antenna port and a fourth antenna port associated with the second antenna port according to one embodiment of the present disclosure.

Embodiment 6 illustrates a schematic diagram of a third antenna port associated with the first antenna port and a fourth antenna port associated with the second antenna port, as shown in FIG. 6.

In Embodiment 6, the third antenna port and the first antenna port are QCL, the fourth antenna port and the second antenna port are QCL; frequency-domain resources occupied by the third antenna port belong to frequency-domain resources occupied by the first antenna port, and frequency-domain resources occupied by the fourth antenna port belong to frequency-domain resources occupied by the second antenna port.

In one embodiment, a subcarrier occupied by the third antenna port belong to a subcarrier occupied by the first antenna port, a subcarrier occupied by the fourth antenna port belong to a subcarrier occupied by the second antenna port; a number of subcarriers occupied by the first antenna port is no less than a number of subcarriers occupied by the third antenna port, and a number of subcarriers occupied by the second antenna port is no less than a number of subcarriers occupied by the fourth antenna port; frequency-domain resources occupied by the third antenna port comprises a positive integer number of subcarrier(s), frequency-domain resources occupied by the first antenna port comprises a positive integer number of subcarrier(s), frequency-domain resources occupied by the fourth antenna port comprises a positive integer number of subcarrier(s), and frequency-domain resources occupied by the second antenna port comprises a positive integer number of subcarrier(s).

In one embodiment, two antenna ports being QCL refers to: all or part of large-scale properties of a radio signal transmitted on one of the two antenna ports can be used for inferring all or part of large-scale properties of a radio signal transmitted on the other of the two antenna ports.

In one embodiment, two antenna ports being QCL refers to: the two antenna ports at least have a same QCL parameter, and the QCL parameter comprises at least one of a multi-antenna related QCL parameter or a multi-antenna unrelated QCL parameter.

In one embodiment, two antenna ports being QCL refers to: at least a QCL parameter of one of the two antenna ports can be used for inferring at least one QCL parameter of the other of the two antenna port, and the QCL parameter comprises at least one of a multi-antenna related QCL parameter or a multi-antenna unrelated QCL parameter.

In one embodiment, two antenna ports being QCL refers to: a multi-antenna related reception of a radio signal transmitted on one of the two antenna ports can be used for inferring a multi-antenna related reception of a radio signal transmitted on the other of the two antenna ports.

In one embodiment, two antenna ports being QCL refers to: a multi-antenna related transmission of a radio signal transmitted on one of the two antenna ports can be used for inferring a multi-antenna related transmission of a radio signal transmitted on the other of the two antenna ports.

In one embodiment, two antenna ports being QCL refers to: a multi-antenna related reception of a radio signal transmitted on one of the two antenna ports can be used for inferring a multi-antenna related transmission of a radio signal transmitted on the other of the two antenna ports, and a receiver of the radio signal transmitted on one of the two antenna ports is the same as a transmitter of the radio signal transmitted on the other of the two antenna ports.

In one embodiment, the QCL parameter comprising at least one of a multi-antenna related QCL parameter or a multi-antenna unrelated QCL parameter.

In one embodiment, the QCL parameter comprises a multi-antenna related QCL parameter.

In one embodiment, the QCL parameter comprises a multi-antenna unrelated QCL parameter.

In one embodiment, the QCL parameter comprises a multi-antenna related QCL parameter or a multi-antenna unrelated QCL parameter.

In one embodiment, a multi-antenna related QCL parameter comprises: one or more of an angle of arrival, an angle of departure, spatial correlation, a multi-antenna related transmission and a multi-antenna related reception.

In one embodiment, a multi-antenna unrelated QCL parameter comprises: one or more of an Average delay, a delay spread, a Doppler spread, a Doppler shift, a path loss and an average gain.

In one embodiment, the multi-antenna related reception refers to Spatial Rx parameters.

In one embodiment, the multi-antenna related reception refers to a reception beam.

In one embodiment, the multi-antenna related reception refers to a reception beamforming matrix.

In one embodiment, the multi-antenna related reception refers to a reception analog beamforming matrix.

In one embodiment, the multi-antenna related reception refers to a reception analog beamforming vector.

In one embodiment, the multi-antenna related reception refers to a reception beamforming vector.

In one embodiment, the multi-antenna related reception refers to reception spatial filtering.

In one embodiment, the multi-antenna related transmission refers to Spatial Tx parameters.

In one embodiment, the multi-antenna related transmission refers to a transmission beam.

In one embodiment, the multi-antenna related transmission refers to a transmission beamforming matrix.

In one embodiment, the multi-antenna related transmission refers to a transmission analog beamforming matrix.

In one embodiment, the multi-antenna related transmission refers to a transmission analog beamforming vector.

In one embodiment, the multi-antenna related transmission refers to a transmission beamforming vector.

In one embodiment, the multi-antenna related transmission refers to transmission spatial filtering.

In one embodiment, the Spatial Tx parameter include one or more of a transmission antenna port, a transmission antenna port set, a transmission beam, a transmission analog beamforming matrix, a transmission analog beamforming vector, a transmission beamforming matrix, a transmission beamforming vector and transmission spatial filtering.

In one embodiment, Spatial Rx parameters includes one or more of a reception beam, a reception analog beamforming matrix, a reception analog beamforming vector, a reception beamforming matrix, a reception beamforming vector and reception spatial filtering.

Embodiment 7

Figure 7:
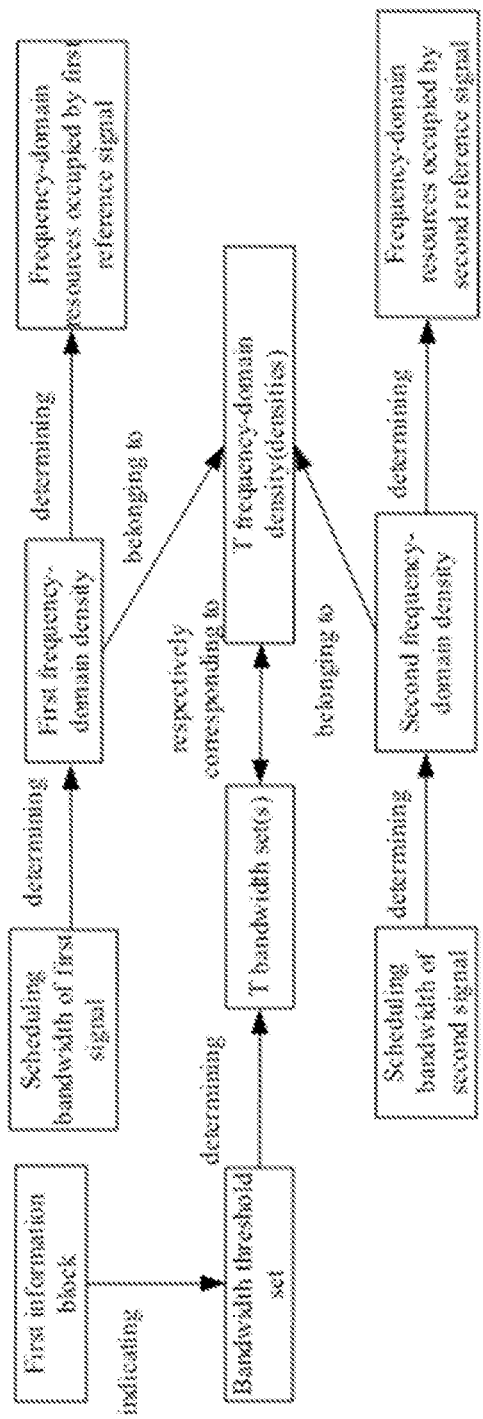
FIG. 7 illustrates a schematic diagram of a first frequency-domain density and a second frequency-domain density according to one embodiment of the present disclosure.

Embodiment 7 illustrates a schematic diagram of a first frequency-domain density and a second frequency-domain density, as shown in FIG. 7.

In Embodiment 7, the first information block in the present disclosure is used for indicating a bandwidth threshold set, the bandwidth threshold set is used for determining T bandwidth set(s), and the T bandwidth set(s) corresponds (respectively correspond) to T frequency-domain density (densities), T being a positive integer; a scheduling bandwidth of the first signal in the present disclosure is used for determining a first frequency-domain density, the first frequency-domain density is one of the T frequency-domain density(densities), a scheduling bandwidth of the second signal in the present disclosure is used for determining a second frequency-domain density, the second frequency-domain density is used for determining frequency-domain resources occupied by the first reference signal in the present disclosure, and the second frequency-domain density is used for determining frequency-domain resources occupied by the second reference signal in the present disclosure.

In one embodiment, T is equal to 1.

In one embodiment, T is greater than 1.

In one embodiment, a first bandwidth set is one of the T bandwidth set(s) that comprises the scheduling bandwidth of the first signal, and the first frequency-domain density is one of the T frequency-domain density(densities) that corresponds to the first bandwidth set; a second bandwidth set is one of the T bandwidth set(s) that comprises the scheduling bandwidth of the second signal, and the second frequency-domain density is one of the T frequency-domain density (densities) that corresponds to the second bandwidth set.

In one embodiment, T is equal to 1, a scheduling bandwidth of the first signal belongs to the T bandwidth set, a scheduling bandwidth of the second signal belongs to the T bandwidth set, the first frequency-domain density is the T frequency-domain density, and the second frequency-domain density is the T frequency-domain density.

In one embodiment, the first time-frequency resource block set comprises N1 time-frequency resource block(s), the second time-frequency resource block set comprises N2 time-frequency resource block(s), N1 and N2 both being positive integers; the first reference signal is transmitted in M1 time-frequency resource block(s) in the N1 time-frequency resource block(s), and the second reference signal is transmitted in M2 time-frequency resource block(s) in the N2 time-frequency resource block(s), M1 being a positive integer no greater than N1, M2 being a positive integer no greater than N2; the scheduling bandwidth of the first signal is equal to N1, and the scheduling bandwidth of the second signal is equal to N2.

Embodiment 8

Figure 8:
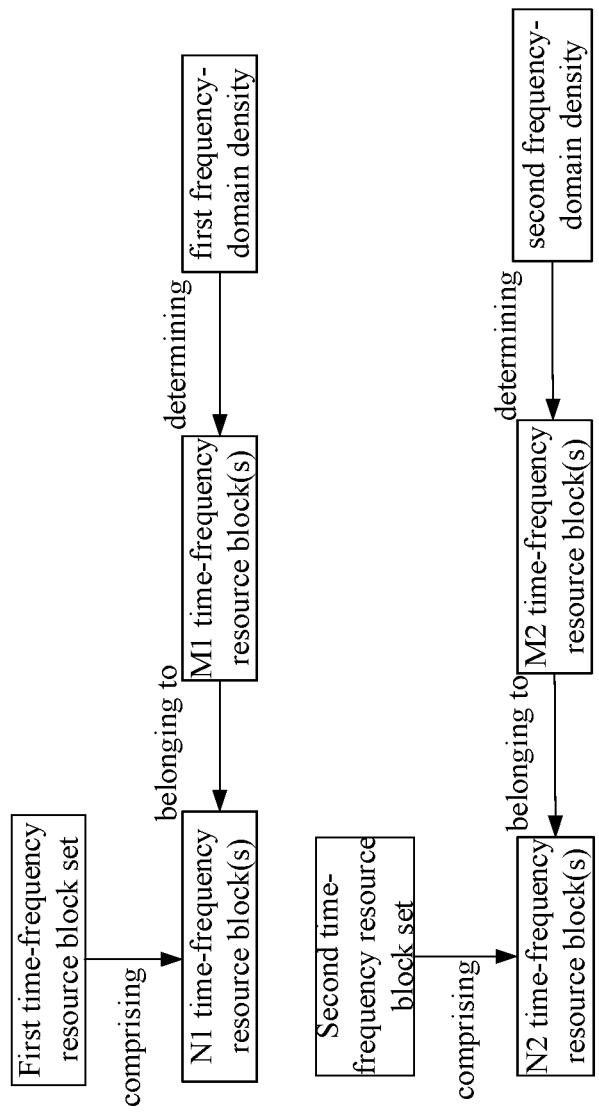
FIG. 8 illustrates a schematic diagram of determination of M1 time-frequency resource block(s) and M2 time-frequency resource block(s) according to one embodiment of the present disclosure.

Embodiment 8 illustrates a schematic diagram of determination of M1 time-frequency resource block(s) and M2 time-frequency resource block(s), as shown in FIG. 8.

In Embodiment 8, the first time-frequency resource block set in the present disclosure comprises N1 time-frequency resource block(s), the second time-frequency resource block set in the present disclosure comprises N2 time-frequency resource block(s), N1 and N2 both being positive integers; the first reference signal in the present disclosure is transmitted in M1 time-frequency resource block(s) in the N1 time-frequency resource block(s), and the second reference signal in the present disclosure is transmitted in M2 time-frequency resource block(s) in the N2 time-frequency resource block(s), M1 being a positive integer no greater than the M, M2 being a positive integer no greater than the N2; the first frequency-domain density in the present disclosure is used for determining the M1 time-frequency resource block(s), and the second frequency-domain density in the present disclosure is used for determining the M2 time-frequency resource block(s).

In one embodiment, M1 is greater than 1, an absolute value of a difference value of relative indexes of any two of the M1 time-frequency resource blocks that are adjacent in frequency domain in the N1 time-frequency resource blocks is equal to the first frequency-domain density, and the relative indexes of the N1 time-frequency resource blocks are respectively 0, 1, . . . , N1-1; M2 is greater than 1, an absolute value of a difference value of relative indexes of any two of the M2 time-frequency resource blocks that are adjacent in frequency domain in the N2 time-frequency resource blocks is equal to the second frequency-domain density; and the relative indexes of the N2 time-frequency resource blocks are respectively 0, 1, . . . , N2-1.

In one embodiment, M1 is greater than 1, an absolute value of a difference value of relative indexes of any two of the M1 time-frequency resource blocks that are adjacent in frequency domain in the N1 time-frequency resource blocks is equal to the first frequency-domain density, and the relative indexes of the N1 time-frequency resource blocks are respectively 1, 2, . . . , N1; M2 is greater than 1, an absolute value of a difference value of relative indexes of any two of the M2 time-frequency resource blocks that are adjacent in frequency domain in the N2 time-frequency resource blocks is equal to the second frequency-domain density; and the relative indexes of the N2 time-frequency resource blocks are respectively 1, 2, . . . , N2.

In one embodiment, a first reference resource block is one of the M1 time-frequency resource block(s), a second reference resource block is one of the M2 time-frequency resource block(s).

In one subembodiment of the above embodiment, M1 is equal to 1, and the first reference resource block is the M1 time-frequency resource block.

In one subembodiment of the above embodiment, M2 is equal to 1, and the second reference resource block is the M2 time-frequency resource block.

In one subembodiment of the above embodiment, the first reference signal is one of the M1 time-frequency resource block(s) with a minimum index, and the second reference resource block is one of the M2 time-frequency resource block(s) with a minimum index.

In one subembodiment of the above embodiment, the first reference signal is one of the M1 time-frequency resource block(s) with a maximum index, and the second reference resource block is one of the M2 time-frequency resource block(s) with a maximum index.

In one subembodiment of the above embodiment, the first reference resource block and the second reference resource block are predefined.

In one subembodiment of the above embodiment, the first reference resource block and the second reference resource block are configured.

In one subembodiment of the above embodiment, the first reference resource block and the second reference resource block are implicitly determined.

In one subembodiment of the above embodiment, frequency-domain resources occupied by the first reference resource block and the second reference resource block are both $k_{ref}^{RB}$, and the specific meaning of the $k_{ref}^{RB}$ can be found in 3GPP TS38.211, section 6.4.1.2.2.1.

In one subembodiment of the above embodiment, the first reference resource block and the second reference resource block are related to a first identifier, the first identifier is carried by the first signaling, and the first identifier is a Radio Network Temporary Identifier(RNTI) of the first signaling.

In one subembodiment of the above embodiment, the first reference resource block and the second reference resource block are related to a first identifier, the first identifier is carried by the first signaling, and the first identifier is $n_{RNTI}$, and the specific meaning of the $n_{RNTI}$ can be found in 3GPP TS38.211, section 7.4.1.2.2.

In one subembodiment of the above embodiment, the first reference resource block and the second reference resource block are related to a first identifier, the first identifier is carried by the first signaling, and the first identifier is $n_{RNTI}$, and the specific meaning of the $n_{RNTI}$ can be found in 3GPP TS38.211, section 6.4.1.2.2.1.

In one subembodiment of the above embodiment, the first reference resource block and the second reference resource block are related to a first identifier, the first identifier is carried by the first signaling, and the first identifier is a signaling identifier of the first signaling.

In one subembodiment of the above embodiment, the first reference resource block and the second reference resource block are related to a first identifier, the first identifier is carried by the first signaling, and the first identifier is used for generating a Reference Signal sequence of DMRS of the first signaling.

In one subembodiment of the above embodiment, the first reference resource block and the second reference resource block are related to a first identifier, the first identifier is carried by the first signaling, and a Cyclic Redundancy Check(CRC) bit sequence of the first signaling is scrambled by the first identifier.

Embodiment 9

Figure 9:
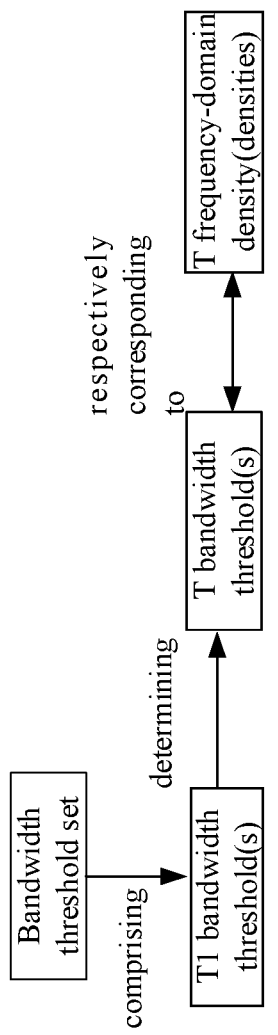
FIG. 9 illustrates a schematic diagram of relation(s) between a bandwidth threshold set and T bandwidth set(s) according to one embodiment of the present disclosure.

Embodiment 9 illustrates a schematic diagram of relation(s) between a bandwidth threshold set and T bandwidth set(s), as shown in FIG. 9.

In Embodiment 9, the bandwidth threshold set comprises T1 bandwidth threshold(s), the T1 bandwidth threshold(s) is(are) used for determining T bandwidth set(s), the T bandwidth set(s) corresponds(respectively correspond) to T frequency-domain density(densities), T1 being a positive integer, T being a positive integer.

In one embodiment, T1 is greater than 1.

In one embodiment, T1 is equal to 2.

In one embodiment, T1 is equal to T.

In one embodiment, T1 is greater than T.

In one embodiment, any of the T1 bandwidth threshold(s) is a non-negative integer.

In one embodiment, any of the T1 bandwidth threshold(s) is a positive real-number.

In one embodiment, any of the T1 bandwidth threshold(s) is a non-negative integer.

In one embodiment, any of the T1 bandwidth threshold(s) is a positive integer.

In one embodiment, each of the T1 bandwidth threshold(s) is a positive integer no greater than 276.

In one embodiment, T is greater than 1, any two of the T bandwidth sets are different, and any two of the T frequency-domain densities are different.

In one embodiment, T is greater than 1, any of the T bandwidth sets comprises a positive integer number of value(s), and any two of the T bandwidth sets do not comprise a same value.

In one embodiment, any of the T bandwidth set comprises a positive integer number of value(s), and any value of the T bandwidth set(s) belongs to only one of the T bandwidth set(s).

In one embodiment, any of the T bandwidth set(s) comprises a positive integer number of value(s), and any value of the T bandwidth set(s) is a positive integer.

In one embodiment, any of the T bandwidth set(s) comprises a positive integer number of consecutive positive integers.

In one embodiment, the T frequency-domain densities are T positive integers that are mutually-different from each other.

In one embodiment, T is equal to 2, and the T frequency-domain densities are 4 and 2 in descending order.

In one embodiment, T is greater than 2.

In one embodiment, a larger value in the T frequency-domain densities represents a sparser frequency-domain distribution.

In one embodiment, a scheduling bandwidth of the first signal is measured by RB, a scheduling bandwidth of the second signal is measured by RB, and any of the T1 bandwidth threshold(s) is measured by RB.

In one embodiment, a scheduling bandwidth of the first signal is measured by subcarrier, a scheduling bandwidth of the second signal is measured by subcarrier, and any of the T1 bandwidth threshold(s) is measured by subcarrier.

In one embodiment, a scheduling bandwidth of the first signal is measured by Hz, a scheduling bandwidth of the second signal is measured by Hz, and any of the T1 bandwidth threshold(s) is measured by Hz.

In one embodiment, the first time-frequency resource block set comprises N1 time-frequency resource block(s), the second time-frequency resource block set comprises N2 time-frequency resource block(s), N1 and N2 both being positive integers; a scheduling bandwidth of the first signal is N1, and a scheduling bandwidth of the second signal is N2; magnitudes of frequency-domain resources occupied by any two time-frequency resource blocks in the first time-frequency resource block set and the second time-frequency resource block set are the same, and a unit for measurement of any of the T1 bandwidth threshold(s) is a magnitude of frequency-domain resources occupied by a time-frequency resource block.

In one embodiment, the first time-frequency resource block set comprises N1 time-frequency resource block(s), the second time-frequency resource block set comprises N2 time-frequency resource block(s), any time-frequency resource block in the first time-frequency resource block set and the second time-frequency resource block set comprises an RB in frequency domain, and any of the T1 bandwidth threshold(s) is measured by RB.

In one embodiment, T threshold(s) is(are) different bandwidth threshold(s) in the T1 bandwidth threshold(s), T1 is a positive integer no less than T; the T threshold(s) is(are) $b_0$, $b_1, \ldots, b_{T-1}$ in ascending order; $b_T$ is a positive integer greater than $b_{T-1}$; the T frequency-domain density(densities) is(are) $K_0, K_1, \ldots, K_{T-1}$ in ascending order; an i+1th bandwidth set in the T bandwidth set(s) is $[b_i, b_{i+1})$, and the i+1th bandwidth set corresponds to $K_i$, i=0, 1, ..., T-1.

In one subembodiment of the above embodiment, T1 is equal to T.

In one subembodiment of the above embodiment, T1 is greater than T, and there exist two same bandwidth thresholds in the T1 bandwidth thresholds.

In one subembodiment of the above embodiment, the $b_T$ is pre-defined.

In one subembodiment of the above embodiment, the $b_T$ is configured.

In one subembodiment of the above embodiment, the $b_T$ is a maximum scheduling bandwidth.

In one subembodiment of the above embodiment, the $b_T$ is a positive infinity.

In one embodiment, T1 is equal to 2, an i+1th threshold in the T1 bandwidth thresholds is $N_{RBi}$, i=0, 1; the specific meaning of the $N_{RBi}$ and the specific method that the T1 bandwidth thresholds are used for determining T bandwidth set(s) can be found in 3GPP TS38.214, section 6.2.3.

Embodiment 10

Figure 10:
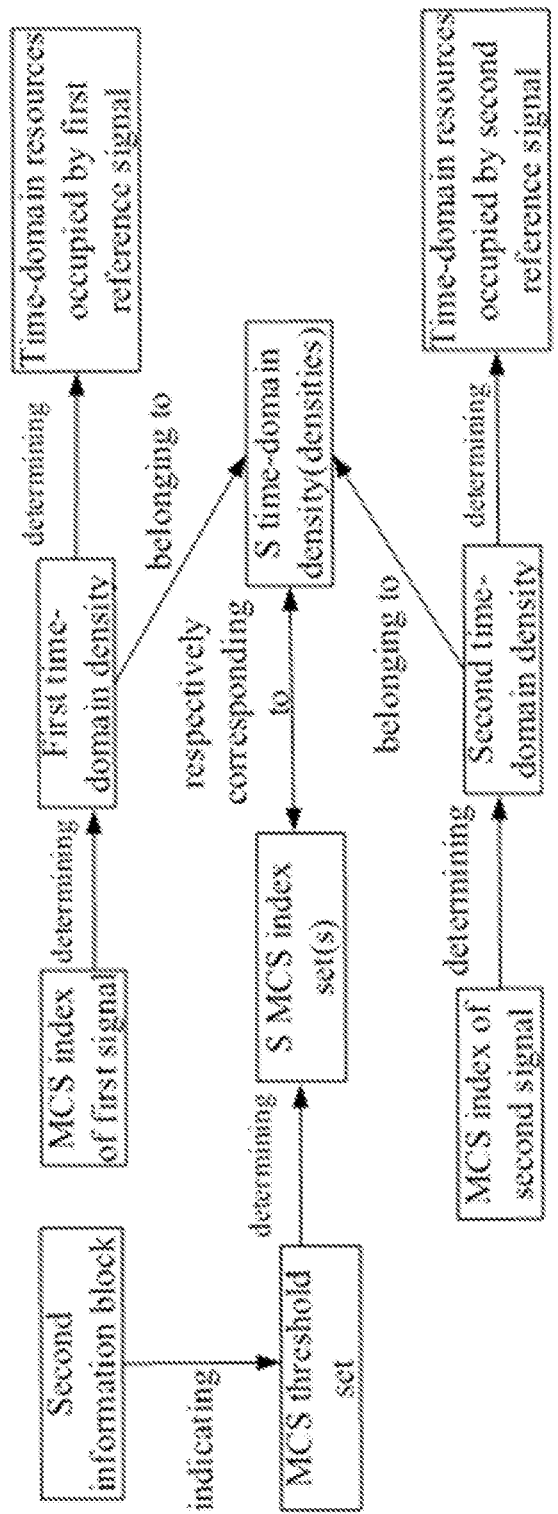
FIG. 10 illustrates a schematic diagram of a first time-domain density and a second time-domain density according to one embodiment of the present disclosure.

Embodiment 10 illustrates a schematic diagram of a first time-domain density and a second time-domain density, as shown in FIG. 10.

In Embodiment 10, the second information block in the present disclosure is used for indicating an MCS threshold set, the MCS threshold set is used for determining S MCS index set(s), and the S MCS index set(s) corresponds(respectively correspond) to S time-domain density(densities), S being a positive integer; an MCS index of the first signal in the present disclosure is used for determining a first time-domain density, the first time-domain density is one of the S time-domain density(densities), an MCS index of the second signal in the present disclosure is used for determining a second time-domain density, the second time-domain density is one of the S time-domain density(densities); the first time-domain density is used for determining time-domain resources occupied by the first reference signal, and the second time-domain density is used for determining time-domain resources occupied by the second reference signal.

In one embodiment, the MCS threshold set comprises S1 MCS threshold(s), the S1 MCS threshold(s) is(are) used for determining S MCS index set(s), the S MCS index set(s) corresponds(respectively correspond) to S time-domain density(densities), S1 being a positive integer, S being a positive integer.

In one embodiment, S is equal to 1.

In one embodiment, S is greater than 1.

In one embodiment, a first MCS index set is one of the S MCS index set(s) that comprises the MCS index of the first signal, the first time-domain density is one of the S time-domain density(densities) that corresponds to the first MCS index set; a second MCS index set is one of the S MCS index set(s) that comprises the MCS index of the second signal, and the second time-domain density is one of the S time-domain density(densities) that corresponds to the second MCS index set.

In one embodiment, S is equal to 1, an MCS index of the first signal belongs to the S MCS index set, an MCS index of the second signal belongs to the S MCS index set, the first time-domain density is the S time-domain density, and the second time-domain density is the S time-domain density.

In one embodiment, the first time-domain density is LPT-RS, the specific meaning that the first time-domain density is used for determining time-domain resources occupied by the first reference signal can be found in 3GPP TS38.211, section 6.4.1.2.2.

Embodiment 11

Figure 11:
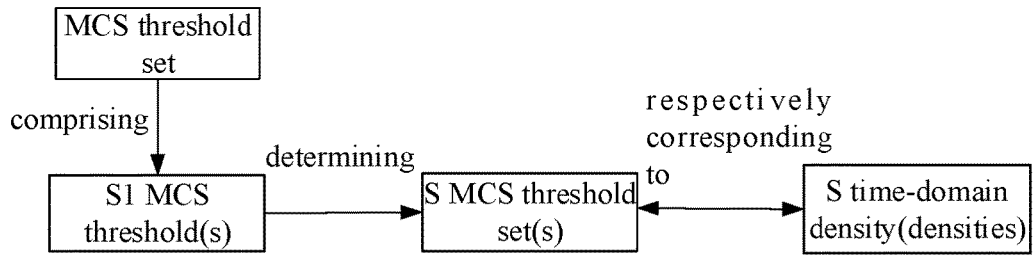
FIG. 11 illustrates a schematic diagram of relation(s) between an MCS threshold set and S MCS index set(s) according to one embodiment of the present disclosure.

Embodiment 11 illustrates a schematic diagram of relation(s) between a first MCS threshold set and S MCS index set(s), as shown in FIG. 11.

In Embodiment 11, the MCS threshold set comprises S1 MCS threshold(s), the S1 MCS threshold(s) is(are) used for determining S MCS index set(s), the S MCS index set(s) corresponds(respectively correspond) to S time-domain density(densities), S1 being a positive integer, S being a positive integer.

In one embodiment, S1 is greater than 1.

In one embodiment, S1 is equal to 3.

In one embodiment, S1 is equal to S.

In one embodiment, S1 is greater than S.

In one embodiment, the S1 MCS threshold(s) is(are) non-negative integer(s).

In one embodiment, each of the S1 MCS threshold(s) is an integer no less than 0 and no greater than 29.

In one embodiment, S1 is equal to 3, and an i-th MCS threshold in the S1 MCS thresholds is a ptrs-$MCS_i$, i=1, 2, 3; the specific meaning of the ptrs-$MCS_i$ and the specific method that the S1 MCS thresholds are used for determining S MCS index set(s) can be found in 3GPP TS38.214, section 6.2.3.

In one embodiment, S is greater than 1, and any two of the S MCS index sets do not comprise a same MCS index.

In one embodiment, any MCS index in the S MCS index set(s) belongs to only one MCS index set in the S MCS index set(s).

In one embodiment, any MCS index set in the S MCS index set(s) comprises a positive integer number of non-negative integer(s).

In one embodiment, any MCS index set in the S MCS index set(s) comprises a positive integer number of consecutive non-negative integers.

In one embodiment, S is greater than 1, any two of the S MCS index sets are mutually different, and any two of the S time-domain densities are mutually different.

In one embodiment, the S time-domain density(densities) is(are) positive integer(s).

In one embodiment, S is equal to 3, the S time-domain densities are 4, 2 and 1 in descending order.

In one embodiment, a larger time-domain density in the S time-domain density(densities) represents a sparser time-domain distribution.

In one embodiment, S MCS threshold(s) is(are) different MCS threshold(s) in the S1 MCS threshold(s), S1 being a positive integer no less than S; the S MCS threshold(s) is(are) $MCS_1$, $MCS_2$, . . . , $MCS_S$ in ascending order; $MCS_{S+1}$ is a positive integer greater than $MCS_S$; the S time-domain density(densities) is(are) $L_1$, $L_2$, . . . , $L_S$ in descending order; an i-th MCS index set in the S MCS index set(s) is [$MCS_i$, $MCS_{i+1}$), and the i-th MCS index set corresponds to $L_i$, i=1, 2, . . . S.

In one subembodiment of the above embodiment, S1 is greater than S.

In one subembodiment of the above embodiment, S1 is equal to S.

In one subembodiment of the above embodiment, $MCS_{S+1}$ is pre-defined.

In one subembodiment of the above embodiment, $MCS_{S+1}$ is configured.

In one subembodiment of the above embodiment, $MCS_{S+1}$ is a maximum MCS index.

Embodiment 12

Figure 12:
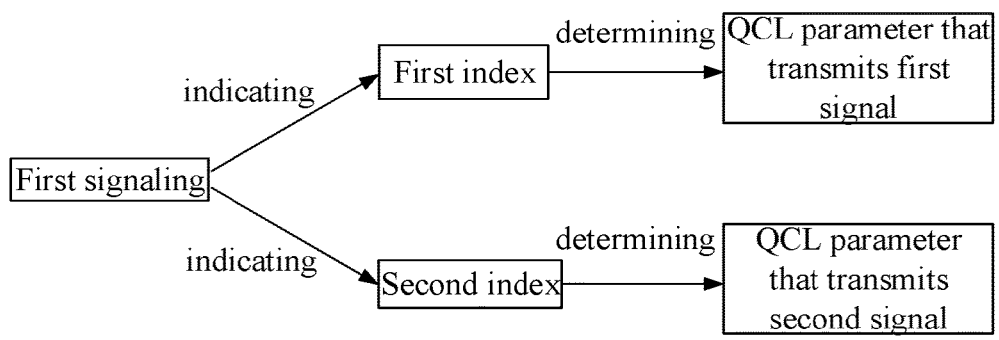
FIG. 12 is a schematic diagram of a first index and a second index according to one embodiment of the present disclosure.

Embodiment 12 illustrates a schematic diagram of a first index and a second index, as shown in FIG. 12.

In Embodiment 12, the first signaling in the present disclosure is used for indicating a first index and a second index, the first index is used for determining a QCL parameter of the first signal in the present disclosure, and the second index is used for determining a QCL parameter of the second signal in the present disclosure.

In one embodiment, the first signaling explicitly indicates a first index and a second index.

In one embodiment, the first signaling implicitly indicates a first index and a second index.

In one embodiment, the first index indicates a Transmission Configuration Indicator(TCI) state, and the second index indicates a TCI state.

In one subembodiment of the above embodiment, the first index comprises an index of a TCI state, and the second index comprises an index of a TCI state.

In one subembodiment of the above embodiment, a first TCI state is a TCI state indicated by the first index, and a QCL parameter indicated by the first TCI state is used for determining a QCL parameter that transmits the first signal; a second TCI state is a TCI state indicated by the second index, and a QCL parameter indicated by the second TCI state is used for determining a QCL parameter that transmits the second signal;

In one embodiment, the first index indicates a reference signal, the second index indicates a reference signal.

In one subembodiment of the above embodiment, the reference signal indicated by the first index comprises a Sounding Reference Signal(SRS), and the reference signal indicated by the second index comprises an SRS.

In one subembodiment of the above embodiment, a QCL parameter of the reference signal indicated by the first index is used for determining a QCL parameter that transmits the first signal; a QCL parameter of the reference signal indicated by the second index is used for determining a QCL parameter that transmits the second signal.

In one embodiment, the first index indicates a first reference signal group, the second index indicates a second reference signal group; the first reference signal group comprises a positive integer number of reference signal(s), and the second reference signal group comprises a positive integer number of reference signal(s).

In one subembodiment of the above embodiment, the reference signal indicated by the first index comprises a Sounding Reference Signal(SRS), and the reference signal indicated by the second index comprises an SRS.

In one subembodiment of the above embodiment, the first index comprises an index of the first reference signal group, and the second index comprises an index of the second reference signal group.

In one subembodiment of the above embodiment, a QCL parameter of the first reference signal group indicated by the first index is used for determining a QCL parameter that transmits the first signal; and a QCL parameter of the second reference signal group indicated by the second index is used for determining a QCL parameter that transmits the second signal.

In one embodiment, a TCI state is used for indicating a positive integer number of QCL parameter(s).

In one embodiment, a TCI state is used for indicating a QCL parameter.

In one embodiment, a TCI state is used for indicating multiple QCL parameters, and the multiple QCL parameters indicated by the TCI state respectively correspond to different QCL parameter types.

In one embodiment, the QCL parameter type comprises a QCL-TypeD, and the specific meaning of the QCL-TypeD can be found in 3GPP TS38.214, section 5.1.5.

In one embodiment, a type of the QCL parameter comprises at least one of QCL-TypeA, QCL-TypeB, QCL-TypeC or QCL-TypeD.

In one subembodiment of the above embodiment, the QCL-TypeA includes Doppler shift, Doppler spread, Average delay and delay spread.

In one subembodiment of the above embodiment, the QCL-TypeB includes Doppler shift and Doppler spread.

In one subembodiment of the above embodiment, the QCL-TypeC includes Doppler shift and Average delay.

In one subembodiment of the above embodiment, the QCL-TypeD includes Spatial Rx parameters, and the specific meaning of the QCL-TypeD can be found in 3GPP TS38.214, section 5.1.5.

In one embodiment, a reference signal indicated by a TCI state comprises at least one of a downlink reference signal or an uplink reference signal.

In one embodiment, a reference signal indicated by a TCI state comprises a downlink reference signal.

In one embodiment, a reference signal indicated by a TCI state comprises an uplink reference signal.

In one embodiment, a reference signal indicated by a TCI state comprises a downlink reference signal and an uplink reference signal.

In one embodiment, the downlink reference signal comprises at least one of a CSI-RS or a Synchronization Signal Block(SSB).

In one embodiment, the downlink reference signal comprises a CSI-RS.

In one embodiment, the downlink reference signal comprises an SSB.

In one embodiment, the uplink reference signal comprises an SRS.

In one embodiment, a QCL parameter indicated by a TCI state is a QCL parameter of a reference signal indicated by the TCI state.

In one subembodiment of the above embodiment, the reference signal comprises at least one of a downlink reference signal or an uplink reference signal.

In one subembodiment of the above embodiment, the reference signal comprises a downlink reference signal and an uplink reference signal.

In one subembodiment of the above embodiment, the reference signal comprises a downlink reference signal.

In one subembodiment of the above embodiment, the reference signal comprises an uplink reference signal.

In one subembodiment of the above embodiment, the reference signal comprises at least one of a CSI-RS, an SSB or an SRS.

In one embodiment, a TCI state indicates a reference signal, the TCI state is used for indicating a QCL parameter; the QCL parameter indicated by the TCI state is a QCL parameter of the reference signal indicated by the TCI state.

In one subembodiment of the above embodiment, the reference signal comprises at least one of a downlink reference signal or an uplink reference signal.

In one subembodiment of the above embodiment, the reference signal comprises a downlink reference signal and an uplink reference signal.

In one subembodiment of the above embodiment, the reference signal comprises a downlink reference signal.

In one subembodiment of the above embodiment, the reference signal comprises an uplink reference signal.

In one subembodiment of the above embodiment, the reference signal comprises at least one of a CSI-RS, an SSB or an SRS.

In one embodiment, a TCI state indicates multiple reference signals, the TCI state is used for indicating multiple QCL parameters, the multiple QCL parameters indicated by the TCI state are respectively QCL parameters of the multiple reference signals indicated by the TCI state.

In one subembodiment of the above embodiment, the reference signal comprises at least one of a downlink reference signal or an uplink reference signal.

In one subembodiment of the above embodiment, the reference signal comprises a downlink reference signal and an uplink reference signal.

In one subembodiment of the above embodiment, the reference signal comprises a downlink reference signal.

In one subembodiment of the above embodiment, the reference signal comprises an uplink reference signal.

In one subembodiment of the above embodiment, the reference signal comprises at least one of a CSI-RS, an SSB or an SRS.

In one embodiment, a QCL parameter of a reference signal is indicated by a spatialRelationInfo field in an RRC signaling.

In one embodiment, a QCL parameter of a reference signal is indicated by a qcl-info field in an RRC signaling.

In one embodiment, a QCL parameter of a reference signal comprises receiving or transmitting a QCL parameter of the reference signal.

In one embodiment, a QCL parameter of a reference signal comprises receiving a QCL parameter of the reference signal.

In one embodiment, a QCL parameter of a reference signal comprises transmitting a QCL parameter of the reference signal.

In one embodiment, a QCL parameter of a downlink reference signal comprises receiving a QCL parameter of the downlink reference signal.

In one embodiment, a QCL parameter of an uplink reference signal comprises transmitting a QCL parameter of the uplink reference signal.

In one embodiment, a QCL parameter of a first given signal is used for determining a QCL parameter that transmits the first signal; and a QCL parameter of a second given signal is used for determining a QCL parameter of the second signal.

In one subembodiment of the above embodiment, a QCL parameter of the first given signal corresponds to a QCL parameter indicated by the first TCI state in the present disclosure, and a QCL parameter of the second given signal corresponds to a QCL parameter indicated by the second TCI state in the present disclosure.

In one subembodiment of the above embodiment, a QCL parameter of the first given signal corresponds to a QCL parameter of the reference signal indicated by the first index in the present disclosure, and a QCL parameter of the second given signal corresponds to a QCL parameter of the reference signal indicated by the second index in the present disclosure.

In one subembodiment of the above embodiment, a QCL parameter of the first given signal corresponds to a QCL parameter of the first reference signal group indicated by the first index in the present disclosure, and a QCL parameter of the second given signal corresponds to a QCL parameter of the second reference signal group indicated by the second index in the present disclosure.

In one subembodiment of the above embodiment, the QCL parameter of the first given signal is used for receiving the first given signal, or, the QCL parameter of the first given signal is used for transmitting the first given signal.

In one subembodiment of the above embodiment, the first given signal is transmitted on a DL, and the QCL parameter of the first given signal is used for receiving the first given signal.

In one subembodiment of the above embodiment, the first given signal is transmitted on a UL, and the QCL parameter of the first given signal is used for transmitting the first given signal.

In one subembodiment of the above embodiment, the first given signal is transmitted on a DL, and the QCL parameter of the first given signal is a QCL parameter that receives the first given signal.

In one subembodiment of the above embodiment, the first given signal is transmitted on a UL, and the QCL parameter of the first given signal is a QCL parameter that transmits the first given signal.

In one subembodiment of the above embodiment, the QCL parameter of the second given signal is used for receiving the second given signal, or, the QCL parameter of the second given signal is used for transmitting the second given signal.

In one subembodiment of the above embodiment, the second given signal is transmitted on a DL, and the QCL parameter of the second given signal is used for receiving the second given signal.

In one subembodiment of the above embodiment, the second given signal is transmitted on a UL, and the QCL parameter of the second given signal is used for transmitting the second given signal.

In one subembodiment of the above embodiment, the second given signal is transmitted on a DL, and the QCL parameter of the second given signal is a QCL parameter that receives the second given signal.

In one subembodiment of the above embodiment, the second given signal is transmitted on a UL, and the QCL parameter of the second given signal is a QCL parameter that transmits the second given signal.

In one subembodiment of the above embodiment, the QCL parameter of the first given signal is used for transmitting the first signal, and the QCL parameter of the second given signal is used for transmitting the first signal.

In one subembodiment of the above embodiment, the QCL parameter of the first given signal can be used for inferring the QCL parameter that transmits the first signal, and the QCL parameter of the second given signal can be used for inferring the QCL parameter that transmits the second signal.

In one subembodiment of the above embodiment, the QCL parameter of the first given signal is the same as the QCL parameter that transmits the first signal, and the QCL parameter of the second given signal is the same as the QCL parameter that transmits the second signal.

Embodiment 13

Figure 13:
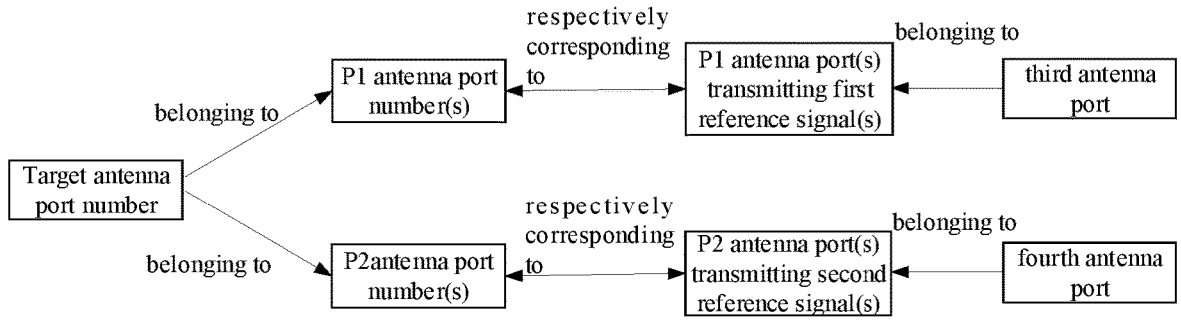
FIG. 13 illustrates a schematic diagram of P1 antenna port number(s), a first reference signal, P2 antenna port number(s) and a second reference signal according to one embodiment of the present disclosure.

Embodiment 13 illustrates a schematic diagram of P1 antenna port number(s), a first reference signal, P2 antenna port number(s) and a second reference signal, as shown in FIG. 13.

In Embodiment 13, P1 antenna port number(s) is(are) port number(s) of P1 antenna port(s) that transmits(transmit) the first reference signal, the third antenna port in the present disclosure is one of the P1 antenna port(s), and the target antenna port number in the present disclosure is one of the P1 antenna port number(s); P2 antenna port number(s) is(are) port number(s) of P2 antenna port(s) that transmits (transmit) the second reference signal, the fourth antenna port in the present disclosure is one of the P2 antenna port(s), and the target antenna port number is one of the P2 antenna port number(s); P1 is a positive integer, and P2 is a positive integer.

In one embodiment, P1 is equal to 1, the P1 antenna port number is the target antenna port number, and the third antenna port is the P1 antenna port.

In one embodiment, P1 is greater than 1, the target antenna port number is one of the P1 antenna port numbers, and the third antenna port is one of the P1 antenna ports whose corresponding port number is the target antenna port number.

In one embodiment, P1 is greater than 1, the target antenna port number is any of the P1 antenna port numbers, and the third antenna port is one of the P1 antenna ports whose corresponding port number is the target antenna port number.

In one embodiment, P2 is equal to 1, the P2 antenna port is the target antenna port number, and the fourth antenna port is the P2 antenna port.

In one embodiment, P2 is greater than 1, the target antenna port number is one of the P2 antenna port numbers, and the fourth antenna port is one of the P2 antenna ports whose corresponding port number is the target antenna port number.

In one embodiment, P2 is greater than 1, the target antenna port number is any of the P2 antenna port numbers, and the fourth antenna port is one of the P2 antenna ports whose corresponding port number is the target antenna port number.

Embodiment 14

Figure 14:
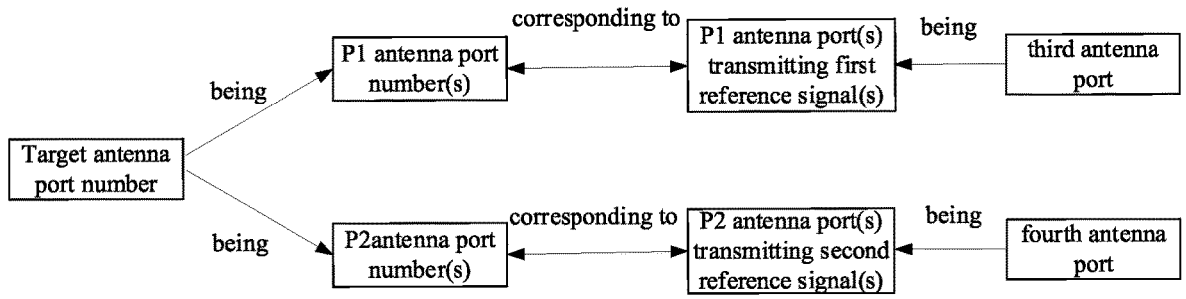
FIG. 14 illustrates a schematic diagram of P1 and P2 according to one embodiment of the present disclosure.

Embodiment 14 illustrates a schematic diagram of P1 and P2, as shown in FIG. 14.

In Embodiment 14, P1 is equal to 1, P2 is equal to 1, the P1 antenna port number in the present disclosure is the target antenna port number in the present disclosure, the third antenna port in the present disclosure is the P1 antenna port, the P2 antenna port number in the present disclosure is the target antenna port number, and the fourth antenna port in the present disclosure is the P2 antenna port.

Embodiment 15

Figure 15:
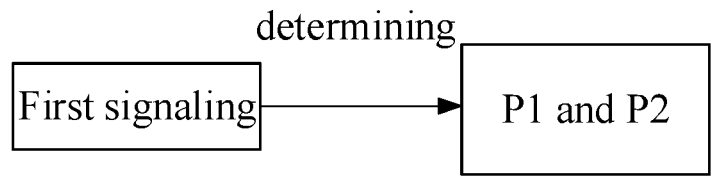
FIG. 15 illustrates a schematic diagram of P1 and P2 according to another embodiment of the present disclosure.

Embodiment 15 illustrates another schematic diagram of P1 and P2, as shown in FIG. 15.

In Embodiment 15, the first signaling is used for determining P1 and P2.

In one embodiment, the first signaling is used for indicating P1 and P2.

In one embodiment, the first signaling explicitly indicates P1 and P2.

In one embodiment, the first signaling implicitly indicates P1 and P2.

Embodiment 16

Figure 16:
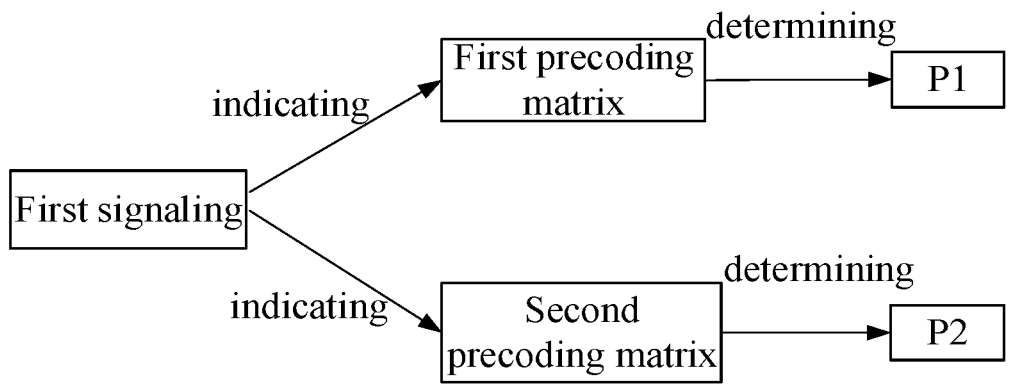
FIG. 16 illustrates a schematic diagram of relations among a first precoding matrix, a second precoding matrix, P1 and P2 according to one embodiment of the present disclosure.

Embodiment 16 illustrates a schematic diagram of relations among a first precoding matrix, a second precoding matrix, P1 and P2, as shown in FIG. 16.

In Embodiment 16, the first signaling in the present disclosure is used for indicating a first precoding matrix and a second precoding matrix, the first precoding matrix is used for determining a transmission precoding matrix of the first signal in the present disclosure, and the second precoding matrix is used for determining a transmission precoding matrix of the second signal in the present disclosure; the first precoding matrix is used for determining the P1, and the second precoding matrix is used for determining the P2.

In one embodiment, P1 is equal to 1, a transmission antenna port of the first precoding matrix belongs to only one of a third port number group and a fourth port number group, the third antenna port is the P1 antenna port, and the P1 antenna port number is the target antenna port number.

In one embodiment, P1 is equal to 1, a third port number group and a fourth port number group respectively correspond to a third antenna port number and a fourth antenna port number; a transmission antenna port of the first precoding matrix belongs to only the third port number group between the third port number group and the fourth port number group, and the P1 antenna port number and the target antenna port number are both the third antenna port number.

In one embodiment, P1 is equal to 1, a third port number group and a fourth port number group respectively correspond to a third antenna port number and a fourth antenna port number; a transmission antenna port of the first precoding matrix belongs to only the fourth port number group between the third port number group and the fourth port number group, and the P1 antenna port number and the target antenna port number are both the fourth antenna port number.

In one embodiment, P1 is equal to 2, a third port number group and a fourth port number group respectively correspond to a third antenna port number and a fourth antenna port number; the third port number group and the fourth port number group both comprise a port number of a transmission antenna port of the first precoding matrix, and the P1 antenna port numbers comprises the third antenna port number and the fourth antenna port number.

In one embodiment, P2 is equal to 1, a transmission antenna port of the second precoding matrix belongs to only one of a third port number group or a fourth port number group, the fourth antenna port is the P2 antenna port, and the P1 antenna port number is the target antenna port number.

In one embodiment, P2 is equal to 1, a third port number group and a fourth port number group respectively correspond to a third antenna port number and a fourth antenna port number; a transmission antenna port of the second precoding matrix belongs to only the third port number group between the third port number group and the fourth port number group, and the P2 antenna port number and the target antenna port number are both the third antenna port number.

In one embodiment, P2 is equal to 1, a third port number group and a fourth port number group respectively correspond to a third antenna port number and a fourth antenna port number; a transmission antenna port of the second precoding matrix belongs to only the fourth port number group between the third port number group and the fourth port number group, and the P2 antenna port number and the target antenna port number are both the fourth antenna port number.

In one embodiment, P2 is equal to 2, a third port number group and a fourth port number group respectively correspond to a third antenna port number and a fourth antenna port number; the third port number group and the fourth port number group both comprise a port number of a transmission antenna port of the second precoding matrix, and the P2 antenna port numbers comprises the third antenna port number and the fourth antenna port number.

In one embodiment, specific meanings of the first precoding matrix determining the P1 antenna port number(s) and the second precoding matrix determining the P2 antenna port number(s) can be found in 3GPP TS38.214, section 6.2.3.

In one embodiment, the third port number group comprises PUSCH antenna port numbers 1000 and 1002, and the fourth port number group comprises PUSCH antenna port numbers 1001 and 1003.

In one embodiment, the third antenna port number is PT-RS port 0, and the fourth antenna port number is PT-RS port 1.

In one embodiment, any antenna port number in the third port number group does not belong to the fourth port number group, the third port number group comprises a positive integer number of antenna port number(s), and the fourth port number group comprises a positive integer number of antenna port number(s).

Embodiment 17

Figure 17:
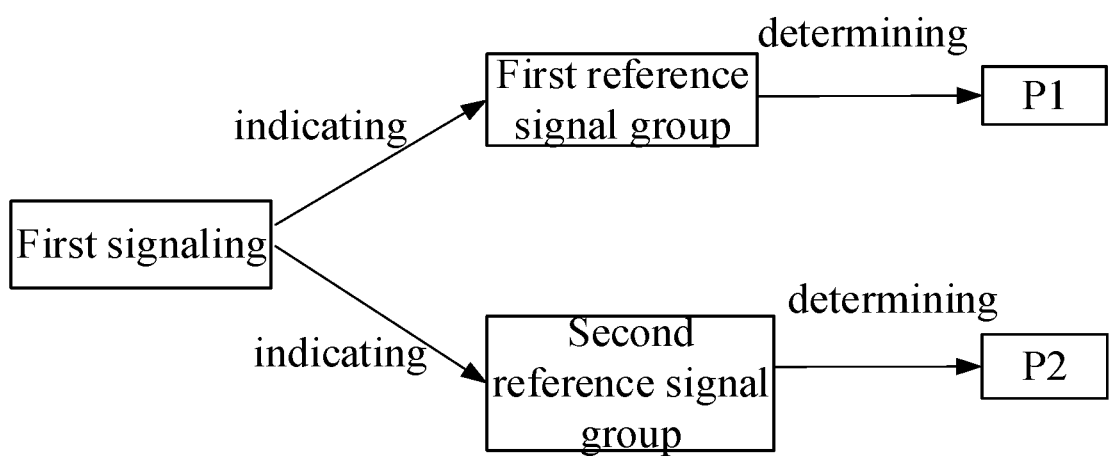
FIG. 17 illustrates a schematic diagram of relations among a first reference signal group, a second reference signal group, P1 and P2 according to one embodiment of the present disclosure.

Embodiment 17 illustrates a schematic diagram of relations among a first reference signal group, a second reference signal group, P1 and P2, as shown in FIG. 17.

In Embodiment 17, the first signaling in the present disclosure is used for indicating a first reference signal group and a second reference signal group, the first reference signal group comprises a positive integer number of reference signal(s), and the second reference signal group comprises a positive integer number of reference signal(s); the first reference signal group is used for determining P1, and the second reference signal group is used for determining P2.

In one embodiment, the first index in the present disclosure indicates a first reference signal group, and the second index in the present disclosure indicates a second reference signal group.

In one embodiment, the first reference signal group is used for determining a transmission precoding matrix of the first signal, and the second reference signal group is used for determining a transmission precoding matrix of the second signal.

Any reference signal in the first reference signal group is associated with only one of a third antenna port number or a fourth antenna port number, and any reference signal in the second reference signal group is associated with only one of a third antenna port number or a fourth antenna port number; P1 is equal to a number of different port number(s) in the third antenna port number and the fourth antenna port number that is(are) associated with a reference signal in the first reference signal group, and P2 is equal to a number of different port number(s) in the third antenna port number and the fourth antenna port number that is(are) associated with a reference signal in the first reference signal group.

In one subembodiment of the above embodiment, a higher-layer signaling indicates that any reference signal in the first reference signal group is associated with a third antenna port number or a fourth antenna port number, and a higher-layer signaling indicates that any reference signal in the second reference signal group is associated with a third antenna port number or a fourth antenna port number.

In one subembodiment of the above embodiment, each reference signal in the first reference signal group is associated with the third antenna port number, P1 is equal to 1.

In one subembodiment of the above embodiment, each reference signal in the first reference signal group is associated with the fourth antenna port number, P1 is equal to 1.

In one subembodiment of the above embodiment, P1 is equal to 1, each reference signal in the first reference signal group is associated with the third antenna port number, and the P1 antenna port number and the target antenna port number are both the third antenna port number.

In one subembodiment of the above embodiment, P1 is equal to 1, each reference signal in the first reference signal group is associated with the fourth antenna port number, and the P1 antenna port number and the target antenna port number are both the fourth antenna port number.

In one embodiment, P1 is equal to 2, at least one reference signal in the first reference signal group is associated with the third antenna port number, at least one reference signal in the first reference signal group is associated with the fourth antenna port number, and the P1 antenna port numbers comprise the third antenna port number and the fourth antenna port number.

In one subembodiment of the above embodiment, at least one reference signal in the first reference signal group is associated with the third antenna port number, at least one reference signal in the first reference signal group is associated with the fourth antenna port number, and P1 is equal to 2.

In one subembodiment of the above embodiment, each reference signal in the second reference signal group is associated with the third antenna port number, P2 is equal to 1.

In one subembodiment of the above embodiment, each reference signal in the second reference signal group is associated with the fourth antenna port number, P2 is equal to 1.

In one subembodiment of the above embodiment, P2 is equal to 1, each reference signal in the second reference signal group is associated with the third antenna port number, and the P2 antenna port number and the target antenna port number are both the third antenna port number.

In one subembodiment of the above embodiment, P2 is equal to 1, each reference signal in the second reference signal group is associated with the fourth antenna port number, and the P2 antenna port number and the target antenna port number are both the fourth antenna port number.

In one embodiment, P2 is equal to 2, at least one reference signal in the second reference signal group is associated with the third antenna port number, at least one reference signal in the second reference signal group is associated with the fourth antenna port number, and the P2 antenna port numbers comprise the third antenna port number and the fourth antenna port number.

In one subembodiment of the above embodiment, at least one reference signal in the second reference signal group is associated with the third antenna port number, at least one reference signal in the second reference signal group is associated with the fourth antenna port number, and P2 is equal to 2.

In one embodiment, specific meanings of the first reference signal group determining P1 and the second reference signal group determining the P2 antenna port number(s) can be found in 3GPP TS38.214, section 6.2.3.

Embodiment 18

Figure 18:
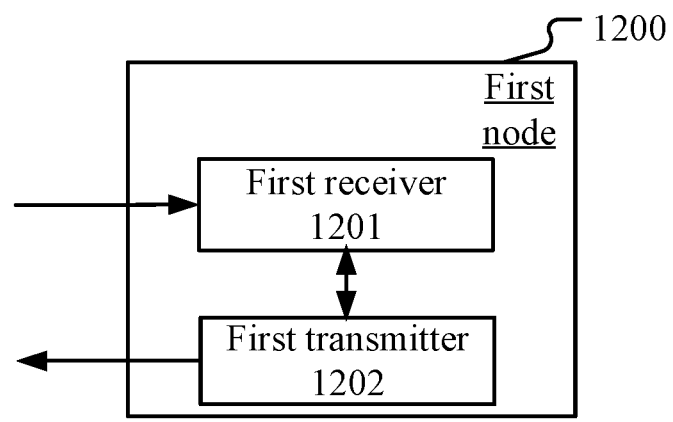
FIG. 18 illustrates a structure block diagram of a processing device in a first node according to one embodiment of the present disclosure.

Embodiment 18 illustrates a structure block diagram of a processing device in a first node, as shown in FIG. 18. In FIG. 18, a first node's processing device 1200 comprises a first receiver 1201 and a first transmitter 1202.

In one embodiment, the first node 1200 is a UE.

In one embodiment, the first node 1200 is a relay node.

In one embodiment, the first node 1200 is a vehicle-mounted communication equipment.

In one embodiment, the first node 1200 is a UE that supports V2X communications.

In one embodiment, the first node 1200 is a relay node that supports V2X communications.

In one embodiment, the first receiver 1201 comprises at least one of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1201 comprises at least the first five of an antenna 452, a receiver 454, a multi-antenna receiving processor 458, a receiving processor 456, a controller/processor 459, a memory 460 and a data source 467 in FIG. 4 of the present disclosure.

In one embodiment, the first receiver 1201 comprises at least the first four of an antenna 452, a receiver 454, a multi-antenna receiving processor 458, a receiving processor 456, a controller/processor 459, a memory 460 and a data source 467 in FIG. 4 of the present disclosure.

In one embodiment, the first receiver 1201 comprises at least the first three of an antenna 452, a receiver 454, a multi-antenna receiving processor 458, a receiving processor 456, a controller/processor 459, a memory 460 and a data source 467 in FIG. 4 of the present disclosure.

In one embodiment, the first receiver 1201 comprises at least the first two of an antenna 452, a receiver 454, a multi-antenna receiving processor 458, a receiving processor 456, a controller/processor 459, a memory 460 and a data source 467 in FIG. 4 of the present disclosure.

In one embodiment, the first transmitter 1202 comprises at least one of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first transmitter 1202 comprises at least the first five of an antenna 452, a transmitter 454, a multi-antenna transmitting processor 457, a transmitting processor 468, a controller/processor 459, a memory 460, and a data source 467 in FIG. 4 of the present disclosure.

In one embodiment, the first transmitter 1202 comprises at least the first four of an antenna 452, a transmitter 454, a multi-antenna transmitting processor 457, a transmitting processor 468, a controller/processor 459, a memory 460, and a data source 467 in FIG. 4 of the present disclosure.

In one embodiment, the first transmitter 1202 comprises at least the first three of an antenna 452, a transmitter 454, a multi-antenna transmitting processor 457, a transmitting processor 468, a controller/processor 459, a memory 460, and a data source 467 in FIG. 4 of the present disclosure.

In one embodiment, the first transmitter 1202 comprises at least the first two of an antenna 452, a transmitter 454, a multi-antenna transmitting processor 457, a transmitting processor 468, a controller/processor 459, a memory 460, and a data source 467 in FIG. 4 of the present disclosure.

A first receiver 1201, receives a first signaling, the first signaling being used for determining a first time-frequency resource block set and a second time-frequency resource block set; and a first transmitter 1202, transmits a first signal, a first reference signal and a first demodulation reference signal in the first time-frequency resource block set; and transmits a second signal, a second reference signal and a second demodulation reference signal in the second time-frequency resource block set.

In Embodiment 18, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

In one embodiment, the third antenna port and the first antenna port are QCL, the fourth antenna port and the second antenna port are QCL; frequency-domain resources occupied by the third antenna port belong to frequency-domain resources occupied by the first antenna port, and frequency-domain resources occupied by the fourth antenna port belong to frequency-domain resources occupied by the second antenna port.

In one embodiment, the first receiver 1201 also receives a first information block; herein, the first information block is used for indicating a bandwidth threshold set, the bandwidth threshold set is used for determining T bandwidth set(s), and the T bandwidth set(s) corresponds(respectively correspond) to T frequency-domain density(densities), T being a positive integer; a scheduling bandwidth of the first signal is used for determining a first frequency-domain density, the first frequency-domain density is one of the T frequency-domain density(densities), a scheduling bandwidth of the second signal is used for determining a second frequency-domain density, the second frequency-domain density is one of the T frequency-domain density(densities), the first frequency-domain density is used for determining frequency-domain resources occupied by the first reference signal, and the second frequency-domain density is used for determining frequency-domain resources occupied by the second reference signal.

In one embodiment, the first receiver 1201 also receives a second information block; herein, the second information block is used for indicating an MCS threshold set, the MCS threshold set is used for determining S MCS index set(s), and the S MCS index set(s) corresponds(respectively correspond) to S time-domain density(densities), S being a positive integer; an MCS index of the first signal is used for determining a first time-domain density, the first time-domain density is one of the S time-domain density(densities), an MCS index of the second signal is used for determining a second time-domain density, the second time-domain density is one of the S time-domain density(densities), the first time-domain density is used for determining time-domain resources occupied by the first reference signal, and the second time-domain density is used for determining time-domain resources occupied by the second reference signal.

In one embodiment, the first signaling is used for indicating a first index and a second index, the first index is used for determining a QCL parameter that transmits the first signal, and the second index is used for determining a QCL parameter that transmits the second signal.

In one embodiment, P1 antenna port number(s) is(are) port number(s) of P1 antenna port(s) that transmits(transmit) the first reference signal, the third antenna port is one of the P1 antenna port(s), and the target antenna port number is one of the P1 antenna port number(s); P2 antenna port number(s) is(are) port number(s) of P2 antenna port(s) that transmits (transmit) the second reference signal, the fourth antenna port is one of the P2 antenna port(s), and the target antenna port number is one of the P2 antenna port number(s); P1 is a positive integer, and P2 is a positive integer.

In one embodiment, the P1 is equal to 1, the P2 is equal to 1, the P1 antenna port number is the target antenna port number, the third antenna port is the P1 antenna port, the P2 antenna port number is the target antenna port number, and the fourth antenna port is the P2 antenna port; or, the first signaling is used for determining the P1 and the P2.

Embodiment 19

Figure 19:
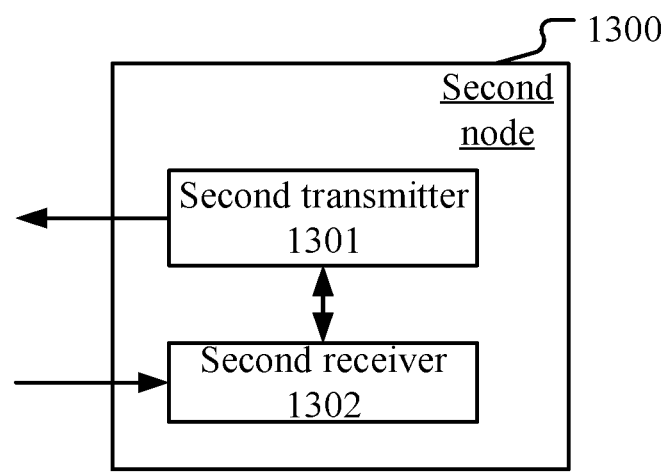
FIG. 19 illustrates a structure block diagram of a processing device in second node according to one embodiment of the present disclosure.

Embodiment 19 illustrates a structure block diagram of a processing device in a second node, as shown in FIG. 19. In FIG. 19, a second node's processing device 1300 comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first five of an antenna 420, a transmitter 418, a multi-antenna transmitting processor 471, a transmitting processor 416, a controller/processor 475 and a memory 476 in FIG. 4 of the present disclosure.

In one embodiment, the second transmitter 1301 comprises at least the first four of an antenna 420, a transmitter 418, a multi-antenna transmitting processor 471, a transmitting processor 416, a controller/processor 475 and a memory 476 in FIG. 4 of the present disclosure.

In one embodiment, the second transmitter 1301 comprises at least the first three of an antenna 420, a transmitter 418, a multi-antenna transmitting processor 471, a transmitting processor 416, a controller/processor 475 and a memory 476 in FIG. 4 of the present disclosure.

In one embodiment, the second transmitter 1301 comprises at least the first two of an antenna 420, a transmitter 418, a multi-antenna transmitting processor 471, a transmitting processor 416, a controller/processor 475 and a memory 476 in FIG. 4 of the present disclosure.

In one embodiment, the second receiver 1302 comprises at least one of an antenna 420, a receiver 418, a multi-antenna receiving processor 472, a receiving processor 470, a controller/processor 475 or a memory 476 in FIG. 4 of the present disclosure.

In one embodiment, the second receiver 1302 comprises at least the first five of an antenna 420, a receiver 418, a multi-antenna receiving processor 472, a receiving processor 470, a controller/processor 475 and a memory 476 in FIG. 4 of the present disclosure.

In one embodiment, the second receiver 1302 comprises at least the first four of an antenna 420, a receiver 418, a multi-antenna receiving processor 472, a receiving processor 470, a controller/processor 475 and a memory 476 in FIG. 4 of the present disclosure.

In one embodiment, the second receiver 1302 comprises at least the first three of an antenna 420, a receiver 418, a multi-antenna receiving processor 472, a receiving processor 470, a controller/processor 475 and a memory 476 in FIG. 4 of the present disclosure.

In one embodiment, the second receiver 1302 comprises at least the first two of an antenna 420, a receiver 418, a multi-antenna receiving processor 472, a receiving processor 470, a controller/processor 475 and a memory 476 in FIG. 4 of the present disclosure.

A second transmitter 1301 transmits a first signaling, the first signaling being used for determining a first time-frequency resource block set and a second time-frequency resource block set; and a second receiver 1302, receives a first signal, a first reference signal and a first demodulation reference signal in the first time-frequency resource block set; and receives a second signal, a second reference signal and a second demodulation reference signal in the second time-frequency resource block set.

In Embodiment 19, the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling is used for determining a port number of the first antenna port and a port number of the second antenna port.

In one embodiment, the third antenna port and the first antenna port are QCL, the fourth antenna port and the second antenna port are QCL; frequency-domain resources occupied by the third antenna port belong to frequency-domain resources occupied by the first antenna port, and frequency-domain resources occupied by the fourth antenna port belong to frequency-domain resources occupied by the second antenna port.

In one embodiment, the second transmitter 1301 also transmits a first information block; herein, the first information block is used for indicating a bandwidth threshold set, the bandwidth threshold set is used for determining T bandwidth set(s), and the T bandwidth set(s) corresponds (respectively correspond) to T frequency-domain density (densities), T being a positive integer; a scheduling bandwidth of the first signal is used for determining a first frequency-domain density, the first frequency-domain density is one of the T frequency-domain density(densities), a scheduling bandwidth of the second signal is used for determining a second frequency-domain density, the second frequency-domain density is one of the T frequency-domain density(densities), the first frequency-domain density is used for determining frequency-domain resources occupied by the first reference signal, and the second frequency-domain density is used for determining frequency-domain resources occupied by the second reference signal.

In one embodiment, the second transmitter 1301 also transmits a second information block; herein, the second information block is used for indicating an MCS threshold set, the MCS threshold set is used for determining S MCS index set(s), and the S MCS index set(s) corresponds(respectively correspond) to S time-domain density(densities), S being a positive integer; an MCS index of the first signal is used for determining a first time-domain density, the first time-domain density is one of the S time-domain density (densities), an MCS index of the second signal is used for determining a second time-domain density, the second time-domain density is one of the S time-domain density(densities), the first time-domain density is used for determining time-domain resources occupied by the first reference signal, and the second time-domain density is used for determining time-domain resources occupied by the second reference signal.

In one embodiment, the first signaling is used for indicating a first index and a second index, the first index is used for determining a QCL parameter that transmits the first signal, and the second index is used for determining a QCL parameter that transmits the second signal.

In one embodiment, P1 antenna port number(s) is(are) port number(s) of P1 antenna port(s) that transmits(transmit) the first reference signal, the third antenna port is one of the P1 antenna port(s), and the target antenna port number is one of the P1 antenna port number(s); P2 antenna port number(s) is(are) port number(s) of P2 antenna port(s) that transmits (transmit) the second reference signal, the fourth antenna port is one of the P2 antenna port(s), and the target antenna port number is one of the P2 antenna port number(s); P1 is a positive integer, and P2 is a positive integer.

In one embodiment, the P1 is equal to 1, the P2 is equal to 1, the P1 antenna port number is the target antenna port number, the third antenna port is the P1 antenna port, the P2 antenna port number is the target antenna port number, and the fourth antenna port is the P2 antenna port; or, the first signaling is used for determining the P1 and the P2.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling, the first signaling being used for determining a first time-frequency resource block set and a second time-frequency resource block set; and
a first transmitter, transmitting a first signal, a first reference signal and a first demodulation reference signal in the first time-frequency resource block set; and transmitting a second signal, a second reference signal and a second demodulation reference signal in the second time-frequency resource block set;
wherein the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling comprises a fourth field, the fourth field comprised in the first signaling is a PTRS-DMRS association field; for the target antenna port number, the fourth field comprised in the first signaling indicates a port number of the first antenna port and a port number of the second antenna port; the first signaling is a DCI (Downlink Control Information) signaling, the first signal is transmitted on a Physical Uplink Shared CHannel (PUSCH), the second signal is transmitted on a PUSCH, the first signal and the second signal respectively comprise two repetitive transmissions of a first bit block, the first bit block comprises a positive integer number of bit(s); a first reference signal comprises a PTRS (Phase-Tracking Reference Signal), and the second reference signal comprises a PTRS; the target antenna port number is a non-negative integer; the first time-frequency resource block set comprises a positive integer number of time-frequency resource blocks that are orthogonal in frequency domain, the second time-frequency resource block set comprises a positive integer number of time-frequency resource blocks that are orthogonal in frequency domain, and the first time-frequency resource block set and the second time-frequency resource block set are orthogonal in time domain.

2. The first node according to claim 1, wherein the third antenna port and the first antenna port are QCL, the fourth antenna port and the second antenna port are QCL; frequency-domain resources occupied by the third antenna port belong to frequency-domain resources occupied by the first antenna port, and frequency-domain resources occupied by the fourth antenna port belong to frequency-domain resources occupied by the second antenna port; two antenna ports being QCL refers to: the two antenna ports at least have a same QCL parameter; the QCL parameter comprises a multi-antenna related QCL parameter; the multi-antenna related QCL parameter comprises: one or more of an angle of arrival, an angle of departure, spatial correlation, a multi-antenna related transmission and a multi-antenna related reception; the multi-antenna related transmission refers to Spatial Tx parameters, or the multi-antenna related transmission refers to transmission spatial filtering; the Spatial Tx parameters include one or more of a transmission antenna port, a transmission antenna port group, a transmission beam, a transmission analog beamforming matrix, a transmission analog beamforming vector, a transmission beamforming matrix, a transmission beamforming vector and transmission spatial filtering;

or, the first receiver also receives a first information block; wherein the first information block is carried by a higher-layer signaling, the first information block is used for indicating a bandwidth threshold set, the bandwidth threshold set is used for determining T bandwidth set(s), and the T bandwidth set(s) corresponds(respectively correspond) to T frequency-domain density(densities), T being a positive integer; a scheduling bandwidth of the first signal is used for determining a first frequency-domain density, the first frequency-domain density is one of the T frequency-domain density(densities), a scheduling bandwidth of the second signal is used for determining a second frequency-domain density, the second frequency-domain density is one of the T frequency-domain density (densities), the first frequency-domain density is used for determining frequency-domain resources occupied by the first reference signal, and the second frequency-domain density is used for determining frequency-domain resources occupied by the second reference signal;

or, the first receiver also receives a second information block; wherein the second information block is carried by a higher-layer signaling, the second information block is used for indicating an MCS threshold set, the MCS threshold set is used for determining S MCS index set(s), and the S MCS index set(s) corresponds (respectively correspond) to S time-domain density (densities), S being a positive integer; an MCS index of the first signal is used for determining a first time-domain density, the first time-domain density is one of the S time-domain density(densities), an MCS index of the second signal is used for determining a second time-domain density, the second time-domain density is one of the S time-domain density(densities), the first time-domain density is used for determining time-domain resources occupied by the first reference signal, and the second time-domain density is used for determining time-domain resources occupied by the second reference signal.

3. The first node according to claim 1, wherein the first signaling is used for indicating a first index and a second index, the first index indicates a reference signal, the second index indicates a reference signal, the reference signal indicated by the first index comprises a Sounding Reference Signal(SRS), and the reference signal indicated by the second index comprises an SRS;

or, the first signaling is used for indicating a first index and a second index, the first index indicates a first reference signal group, the second index indicates a second reference signal group; the first reference signal group comprises a positive integer number of reference signal(s), and the second reference signal group comprises a positive integer number of reference signal(s), the reference signal indicated by the first index comprises a Sounding Reference Signal(SRS), and the reference signal indicated by the second index comprises an SRS.

4. The first node according to claim 1, wherein P1 antenna port number(s) is(are) port number(s) of P1 antenna port(s) that transmits(transmit) the first reference signal, the third antenna port is one of the P1 antenna port(s), and the target antenna port number is one of the P1 antenna port number(s); P2 antenna port number(s) is(are) port number(s) of P2 antenna port(s) that transmits(transmit) the second reference signal, the fourth antenna port is one of the P2 antenna port(s), and the target antenna port number is one of the P2 antenna port number(s); P1 is a positive integer, and P2 is a positive integer.

5. The first node according to claim 1, wherein a number of antenna port of the first reference signal is equal to 1, a number of antenna port of the second reference signal is equal to 1; the target antenna port number is 0, or the target antenna port number is one of 0 or 1.

6. A second node for wireless communications, comprising:
a second transmitter, transmitting a first signaling, the first signaling being used for determining a first time-frequency resource block set and a second time-frequency resource block set; and
a second receiver, receiving a first signal, a first reference signal and a first demodulation reference signal in the first time-frequency resource block set; and receiving a second signal, a second reference signal and a second demodulation reference signal in the second time-frequency resource block set;
wherein the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling comprises a fourth field, the fourth field comprised in the first signaling is a PTRS-DMRS association field; for the target antenna port number, the fourth field comprised in the first signaling indicates a port number of the first antenna port and a port number of the second antenna port; the first signaling is a DCI (Downlink Control Information) signaling, the first signal is transmitted on a Physical Uplink Shared CHannel (PUSCH), the second signal is transmitted on a PUSCH, the first signal and the second signal respectively comprise two repetitive transmissions of a first bit block, the first bit block comprises a positive integer number of bit(s); a first reference signal comprises a PTRS (Phase-Tracking Reference Signal), and the second reference signal comprises a PTRS; the target antenna port number is a non-negative integer; the first time-frequency resource block set comprises a positive integer number of time-frequency resource blocks that are orthogonal in frequency domain, the second time-frequency resource block set comprises a positive integer number of time-frequency resource blocks that are orthogonal in frequency domain, and the first time-frequency resource block set and the second time-frequency resource block set are orthogonal in time domain.

7. The second node according to claim 6, wherein the third antenna port and the first antenna port are QCL, the fourth antenna port and the second antenna port are QCL; frequency-domain resources occupied by the third antenna port belong to frequency-domain resources occupied by the first antenna port, and frequency-domain resources occupied by the fourth antenna port belong to frequency-domain resources occupied by the second antenna port; two antenna ports being QCL refers to: the two antenna ports at least have a same QCL parameter; the QCL parameter comprises a multi-antenna related QCL parameter; the multi-antenna related QCL parameter comprises: one or more of an angle of arrival, an angle of departure, spatial correlation, a multi-antenna related transmission and a multi-antenna related reception; the multi-antenna related transmission refers to Spatial Tx parameters, or the multi-antenna related transmission refers to transmission spatial filtering; the Spatial Tx parameters include one or more of a transmission antenna port, a transmission antenna port group, a transmission beam, a transmission analog beamforming matrix, a transmission analog beamforming vector, a transmission beamforming matrix, a transmission beamforming vector and transmission spatial filtering;

or, the second transmitter also transmits a first information block; wherein the first information block is carried by a higher-layer signaling, the first information block is used for indicating a bandwidth threshold set, the bandwidth threshold set is used for determining T bandwidth set(s), and the T bandwidth set(s) corresponds(respectively correspond) to T frequency-domain density(densities), T being a positive integer; a scheduling bandwidth of the first signal is used for determining a first frequency-domain density, the first frequency-domain density is one of the T frequency-domain density(densities), a scheduling bandwidth of the second signal is used for determining a second frequency-domain density, the second frequency-domain density is one of the T frequency-domain density (densities), the first frequency-domain density is used for determining frequency-domain resources occupied by the first reference signal, and the second frequency-domain density is used for determining frequency-domain resources occupied by the second reference signal;

or, the second transmitter also transmits a second information block; wherein the second information block is carried by a higher-layer signaling, the second information block is used for indicating an MCS threshold set, the MCS threshold set is used for determining S MCS index set(s), and the S MCS index set(s) corresponds(respectively correspond) to S time-domain density(densities), S being a positive integer; an MCS index of the first signal is used for determining a first time-domain density, the first time-domain density is one of the S time-domain density(densities), an MCS index of the second signal is used for determining a second time-domain density, the second time-domain density is one of the S time-domain density(densities), the first time-domain density is used for determining time-domain resources occupied by the first reference signal, and the second time-domain density is used for determining time-domain resources occupied by the second reference signal.

8. The second node according to claim 6, wherein the first signaling is used for indicating a first index and a second index, the first index indicates a reference signal, the second index indicates a reference signal, the reference signal indicated by the first index comprises a Sounding Reference Signal(SRS), and the reference signal indicated by the second index comprises an SRS;

or, the first signaling is used for indicating a first index and a second index, the first index indicates a first reference signal group, the second index indicates a second reference signal group; the first reference signal group comprises a positive integer number of reference signal(s), and the second reference signal group comprises a positive integer number of reference signal(s), the reference signal indicated by the first index comprises a Sounding Reference Signal(SRS), and the reference signal indicated by the second index comprises an SRS.

9. The second node according to claim 6, wherein P1 antenna port number(s) is(are) port number(s) of P1 antenna port(s) that transmits(transmit) the first reference signal, the third antenna port is one of the P1 antenna port(s), and the target antenna port number is one of the P1 antenna port number(s); P2 antenna port number(s) is(are) port number(s) of P2 antenna port(s) that transmits(transmit) the second reference signal, the fourth antenna port is one of the P2 antenna port(s), and the target antenna port number is one of the P2 antenna port number(s); P1 is a positive integer, and P2 is a positive integer.

10. The second node according to claim 6, wherein a number of antenna port of the first reference signal is equal to 1, a number of antenna port of the second reference signal is equal to 1; the target antenna port number is 0, or the target antenna port number is one of 0 or 1.

11. A method in a first node for wireless communications, comprising:

receiving a first signaling, the first signaling being used for determining a first time-frequency resource block set and a second time-frequency resource block set;

transmitting a first signal, a first reference signal and a first demodulation reference signal in the first time-frequency resource block set; and transmitting a second signal, a second reference signal and a second demodulation reference signal in the second time-frequency resource block set;

wherein the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling comprises a fourth field, the fourth field comprised in the first signaling is a PTRS-DMRS association field; for the target antenna port number, the fourth field comprised in the first signaling indicates a port number of the first antenna port and a port number of the second antenna port; the first signaling is a DCI (Downlink Control Information) signaling, the first signal is transmitted on a Physical Uplink Shared CHannel (PUSCH), the second signal is transmitted on a PUSCH, the first signal and the second signal respectively comprise two repetitive transmissions of a first bit block, the first bit block comprises a positive integer number of bit(s); a first reference signal comprises a PTRS (Phase-Tracking Reference Signal), and the second reference signal comprises a PTRS; the target antenna port number is a non-negative integer; the first time-frequency resource block set comprises a positive integer number of time-frequency resource blocks that are orthogonal in frequency domain, the second time-frequency resource block set comprises a positive integer number of time-frequency resource blocks that are orthogonal in frequency domain, and the first time-frequency resource block set and the second time-frequency resource block set are orthogonal in time domain.

12. The method according to claim 11, wherein the third antenna port and the first antenna port are QCL, the fourth antenna port and the second antenna port are QCL; frequency-domain resources occupied by the third antenna port belong to frequency-domain resources occupied by the first antenna port, and frequency-domain resources occupied by the fourth antenna port belong to frequency-domain resources occupied by the second antenna port; two antenna ports being QCL refers to: the two antenna ports at least have a same QCL parameter; the QCL parameter comprises a multi-antenna related QCL parameter; the multi-antenna related QCL parameter comprises: one or more of an angle of arrival, an angle of departure, spatial correlation, a multi-antenna related transmission and a multi-antenna related reception; the multi-antenna related transmission refers to Spatial Tx parameters, or the multi-antenna related transmission refers to transmission spatial filtering; the Spatial Tx parameters include one or more of a transmission antenna port, a transmission antenna port group, a transmission beam, a transmission analog beamforming matrix, a transmission analog beamforming vector, a transmission beamforming matrix, a transmission beamforming vector and transmission spatial filtering;

or, comprising: receiving a first information block; wherein the first information block is carried by a higher-layer signaling, the first information block is used for indicating a bandwidth threshold set, the bandwidth threshold set is used for determining T bandwidth set(s), and the T bandwidth set(s) corresponds(respectively correspond) to T frequency-domain density(densities), T being a positive integer; a scheduling bandwidth of the first signal is used for determining a first frequency-domain density, the first frequency-domain density is one of the T frequency-domain density(densities), a scheduling bandwidth of the second signal is used for determining a second frequency-domain density, the second frequency-domain density is one of the T frequency-domain density (densities), the first frequency-domain density is used for determining frequency-domain resources occupied by the first reference signal, and the second frequency-domain density is used for determining frequency-domain resources occupied by the second reference signal;

or, comprising: receiving a second information block; wherein the second information block is carried by a higher-layer signaling, the second information block is used for indicating an MCS threshold set, the MCS threshold set is used for determining S MCS index set(s), and the S MCS index set(s) corresponds(respectively correspond) to S time-domain density(densities), S being a positive integer; an MCS index of the first signal is used for determining a first time-domain density, the first time-domain density is one of the S time-domain density(densities), an MCS index of the second signal is used for determining a second time-domain density, the second time-domain density is one of the S time-domain density(densities), the first time-domain density is used for determining time-domain resources occupied by the first reference signal, and the second time-domain density is used for determining time-domain resources occupied by the second reference signal.

13. The method according to claim 11, wherein the first signaling is used for indicating a first index and a second index, the first index indicates a reference signal, the second index indicates a reference signal, the reference signal indicated by the first index comprises a Sounding Reference Signal(SRS), and the reference signal indicated by the second index comprises an SRS;

or, the first signaling is used for indicating a first index and a second index, the first index indicates a first reference signal group, the second index indicates a second reference signal group; the first reference signal group comprises a positive integer number of reference signal(s), and the second reference signal group comprises a positive integer number of reference signal(s), the reference signal indicated by the first index comprises a Sounding Reference Signal(SRS), and the reference signal indicated by the second index comprises an SRS.

14. The method according to claim 11, wherein P1 antenna port number(s) is(are) port number(s) of P1 antenna port(s) that transmits(transmit) the first reference signal, the third antenna port is one of the P1 antenna port(s), and the target antenna port number is one of the P1 antenna port number(s); P2 antenna port number(s) is(are) port number(s) of P2 antenna port(s) that transmits(transmit) the second reference signal, the fourth antenna port is one of the P2 antenna port(s), and the target antenna port number is one of the P2 antenna port number(s); P1 is a positive integer, and P2 is a positive integer.

15. The method according to claim 11, wherein a number of antenna port of the first reference signal is equal to 1, a number of antenna port of the second reference signal is equal to 1; the target antenna port number is 0, or the target antenna port number is one of 0 or 1.

16. A method in a second node for wireless communications, comprising:

transmitting a first signaling, the first signaling being used for determining a first time-frequency resource block set and a second time-frequency resource block set;

receiving a first signal, a first reference signal and a first demodulation reference signal in the first time-frequency resource block set; and receiving a second signal, a second reference signal and a second demodulation reference signal in the second time-frequency resource block set;

wherein the first time-frequency resource block set and the second time-frequency resource block set are orthogonal; a measurement performed on the first demodulation reference signal is used for a demodulation of the first signal, a measurement performed on the second demodulation reference signal is used for a demodulation of the second signal; a third antenna port is an antenna port transmitting the first reference signal, a fourth antenna port is an antenna port transmitting the second reference signal, and both a port number of the third antenna port and a port number of the fourth antenna port are a target antenna port number; a first antenna port is an antenna port transmitting the first demodulation reference signal, and the third antenna port is associated with the first antenna port; a second antenna port is an antenna port transmitting the second demodulation reference signal, and the fourth antenna port is associated with the second antenna port; the first signaling comprises a fourth field, the fourth field comprised in the first signaling is a PTRS-DMRS association field; for the target antenna port number, the fourth field comprised in the first signaling indicates a port number of the first antenna port and a port number of the second antenna port; the first signaling is a DCI (Downlink Control Information) signaling, the first signal is transmitted on a Physical Uplink Shared CHannel (PUSCH), the second signal is transmitted on a PUSCH, the first signal and the second signal respectively comprise two repetitive transmissions of a first bit block, the first bit block comprises a positive integer number of bit(s); a first reference signal comprises a PTRS (Phase-Tracking Reference Signal), and the second reference signal comprises a PTRS; the target antenna port number is a non-negative integer; the first time-frequency resource block set comprises a positive integer number of time-frequency resource blocks that are orthogonal in frequency domain, the second time-frequency resource block set comprises a positive integer number of time-frequency resource blocks that are orthogonal in frequency domain, and the first time-frequency resource block set and the second time-frequency resource block set are orthogonal in time domain.

17. The method according to claim 16, wherein the third antenna port and the first antenna port are QCL, the fourth antenna port and the second antenna port are QCL; frequency-domain resources occupied by the third antenna port belong to frequency-domain resources occupied by the first antenna port, and frequency-domain resources occupied by the fourth antenna port belong to frequency-domain resources occupied by the second antenna port; two antenna ports being QCL refers to: the two antenna ports at least have a same QCL parameter; the QCL parameter comprises a multi-antenna related QCL parameter; the multi-antenna related QCL parameter comprises: one or more of an angle of arrival, an angle of departure, spatial correlation, a multi-antenna related transmission and a multi-antenna related reception; the multi-antenna related transmission refers to Spatial Tx parameters, or the multi-antenna related transmission refers to transmission spatial filtering; the Spatial Tx parameters include one or more of a transmission antenna port, a transmission antenna port group, a transmission beam, a transmission analog beamforming matrix, a transmission analog beamforming vector, a transmission beamforming matrix, a transmission beamforming vector and transmission spatial filtering;

or, comprising: transmitting a first information block; wherein the first information block is carried by a higher-layer signaling, the first information block is used for indicating a bandwidth threshold set, the bandwidth threshold set is used for determining T bandwidth set(s), and the T bandwidth set(s) corresponds(respectively correspond) to T frequency-domain density(densities), T being a positive integer; a scheduling bandwidth of the first signal is used for determining a first frequency-domain density, the first frequency-domain density is one of the T frequency-domain density(densities), a scheduling bandwidth of the second signal is used for determining a second frequency-domain density, the second frequency-domain density is one of the T frequency-domain density (densities), the first frequency-domain density is used for determining frequency-domain resources occupied by the first reference signal, and the second frequency-domain density is used for determining frequency-domain resources occupied by the second reference signal;

or, comprising: transmitting a second information block; wherein the second information block is carried by a higher-layer signaling, the second information block is used for indicating an MCS threshold set, the MCS threshold set is used for determining S MCS index set(s), and the S MCS index set(s) corresponds(respectively correspond) to S time-domain density(densities), S being a positive integer; an MCS index of the first signal is used for determining a first time-domain density, the first time-domain density is one of the S time-domain density(densities), an MCS index of the second signal is used for determining a second time-domain density, the second time-domain density is one of the S time-domain density(densities), the first time-domain density is used for determining time-domain resources occupied by the first reference signal, and the second time-domain density is used for determining time-domain resources occupied by the second reference signal.

18. The method according to claim 16, wherein the first signaling is used for indicating a first index and a second index, the first index indicates a reference signal, the second index indicates a reference signal, the reference signal indicated by the first index comprises a Sounding Reference Signal (SRS), and the reference signal indicated by the second index comprises an SRS;

or, the first signaling is used for indicating a first index and a second index, the first index indicates a first reference signal group, the second index indicates a second reference signal group; the first reference signal group comprises a positive integer number of reference signal(s), and the second reference signal group comprises a positive integer number of reference signal(s), the reference signal indicated by the first index comprises a Sounding Reference Signal(SRS), and the reference signal indicated by the second index comprises an SRS.

19. The method according to claim 16, wherein P1 antenna port number(s) is(are) port number(s) of P1 antenna port(s) that transmits(transmit) the first reference signal, the third antenna port is one of the P1 antenna port(s), and the target antenna port number is one of the P1 antenna port number(s); P2 antenna port number(s) is(are) port number(s) of P2 antenna port(s) that transmits(transmit) the second reference signal, the fourth antenna port is one of the P2 antenna port(s), and the target antenna port number is one of the P2 antenna port number(s); P1 is a positive integer, and P2 is a positive integer.

20. The method according to claim 16, wherein a number of antenna port of the first reference signal is equal to 1, a number of antenna port of the second reference signal is equal to 1; the target antenna port number is 0, or the target antenna port number is one of 0 or 1.

* * * * *